United States Patent
Feldman et al.

(10) Patent No.: US 7,699,755 B2
(45) Date of Patent: Apr. 20, 2010

(54) ISOMETRIC EXERCISE SYSTEM AND METHOD OF FACILITATING USER EXERCISE DURING VIDEO GAME PLAY

(75) Inventors: Philip Feldman, Catonsville, MD (US); Peter Tsai, Olney, MD (US); Greg Merril, Bethesda, MD (US); Jason Grimm, Owings Mills, MD (US); Jeff Schott, Bethesda, MD (US)

(73) Assignee: IALabs-CA, LLC, Potomac, MD (US)

( * ) Notice: Subject to any disclaimer, the term of this patent is extended or adjusted under 35 U.S.C. 154(b) by 1058 days.

(21) Appl. No.: 11/350,284

(22) Filed: Feb. 9, 2006

(65) Prior Publication Data
US 2006/0217243 A1 Sep. 28, 2006

Related U.S. Application Data

(63) Continuation-in-part of application No. 10/975,185, filed on Oct. 28, 2004, now abandoned, which is a continuation-in-part of application No. 10/806,280, filed on Mar. 23, 2004, now abandoned, which is a continuation-in-part of application No. 10/309,565, filed on Dec. 4, 2002, now Pat. No. 7,121,982.

(60) Provisional application No. 60/514,897, filed on Oct. 29, 2003, provisional application No. 60/699,384, filed on Jul. 15, 2005.

(51) Int. Cl.
*A63B 71/00* (2006.01)

(52) U.S. Cl. .................... 482/8; 482/1; 482/9; 482/51; 482/53

(58) Field of Classification Search ................ 482/1–9, 482/900–902, 51–54; 434/247
See application file for complete search history.

(56) References Cited

U.S. PATENT DOCUMENTS

| | | | |
|---|---|---|---|
| 2,715,007 A | 8/1955 | Zeitlin | |
| D188,376 S | 7/1960 | Hotkins et al. | |
| 3,170,687 A | 2/1965 | Lugger | |
| 3,428,312 A | 2/1969 | Machen | |
| 3,873,087 A | 3/1975 | Burkart et al. | |

(Continued)

FOREIGN PATENT DOCUMENTS

| | | |
|---|---|---|
| DE | 19900442 A1 | 7/2000 |
| GB | 2038597 A | 7/1980 |
| JP | 9192261 | 7/1997 |
| JP | 9325674 | 12/1997 |

(Continued)

OTHER PUBLICATIONS

"Wii Fit", Wikipedia, http://en.wikipedia.org/wiki/Wii_Fit, retrieved from Internet Aug. 27, 2007.

(Continued)

*Primary Examiner*—Glenn Richman
(74) *Attorney, Agent, or Firm*—Edell, Shapiro & Finnan, LLC

(57) ABSTRACT

An isometric exercise system according to the present invention facilitates user interaction with a host computer system and includes at least one effector, at least one sensor coupled to the effector, a platform to accommodate the user and control circuitry including a processor. The platform accommodates a user and includes the effector attached thereto. The sensor measures at least one force applied by a user to the effector, where the applied force effects a strain on or deflects the effector. The processor receives and processes data corresponding to applied force information measured by the sensor for transference to the host computer system in a compatible format and facilitates user interaction with the host computer system via effector manipulation by the user. The host computer system processes the information to update or respond to events within an executing software application (e.g., a game).

34 Claims, 9 Drawing Sheets

U.S. PATENT DOCUMENTS

| | | | |
|---|---|---|---|
| 4,026,279 A | 5/1977 | Simjian | |
| 4,296,931 A | 10/1981 | Yokoi | |
| 4,337,050 A | 6/1982 | Engalitcheff, Jr. | |
| 4,420,808 A | 12/1983 | Diamond et al. | |
| 4,494,754 A | 1/1985 | Wagner, Jr. | |
| 4,588,054 A | 5/1986 | LeBaron | |
| 4,630,817 A | 12/1986 | Buckley | |
| 4,660,828 A | 4/1987 | Weiss | |
| 4,680,577 A | 7/1987 | Straayer et al. | |
| 4,691,694 A | 9/1987 | Boyd et al. | |
| 4,711,447 A | 12/1987 | Mansfield | |
| 4,742,832 A | 5/1988 | Kauffmann et al. | |
| 4,855,704 A | 8/1989 | Betz | |
| 4,890,495 A | 1/1990 | Slane | |
| 4,938,474 A | 7/1990 | Sweeney et al. | |
| 4,949,993 A | 8/1990 | Stark et al. | |
| D318,073 S | 7/1991 | Jang | |
| 5,054,771 A | 10/1991 | Mansfield | |
| 5,060,932 A | 10/1991 | Yamaguchi | |
| 5,089,960 A | 2/1992 | Sweeney, Jr. | |
| 5,104,119 A | 4/1992 | Lynch | |
| 5,116,296 A | 5/1992 | Watkins et al. | |
| 5,118,094 A | 6/1992 | Lambert | |
| 5,151,071 A | 9/1992 | Jain et al. | |
| 5,195,746 A * | 3/1993 | Boyd et al. | 463/37 |
| 5,199,875 A | 4/1993 | Trumbull | |
| 5,299,810 A | 4/1994 | Pierce et al. | |
| 5,312,315 A | 5/1994 | Mortensen et al. | |
| 5,318,491 A | 6/1994 | Houston | |
| 5,353,242 A | 10/1994 | Crosbie et al. | |
| 5,360,383 A | 11/1994 | Boren | |
| 5,362,298 A | 11/1994 | Brown et al. | |
| 5,368,546 A | 11/1994 | Stark et al. | |
| 5,431,569 A | 7/1995 | Simpkins et al. | |
| 5,437,453 A * | 8/1995 | Hineman | 463/38 |
| 5,462,503 A | 10/1995 | Benjamin et al. | |
| 5,466,200 A | 11/1995 | Ulrich et al. | |
| 5,515,078 A | 5/1996 | Greschler et al. | |
| 5,547,439 A | 8/1996 | Rawls et al. | |
| 5,551,693 A | 9/1996 | Goto et al. | |
| 5,551,920 A | 9/1996 | Ogden et al. | |
| 5,562,572 A | 10/1996 | Carmein | |
| D376,826 S | 12/1996 | Ashida | |
| 5,584,700 A | 12/1996 | Feldman et al. | |
| 5,591,104 A | 1/1997 | Andrus et al. | |
| 5,610,631 A | 3/1997 | Bouton et al. | |
| 5,618,251 A | 4/1997 | Sullivan | |
| 5,642,496 A | 6/1997 | Kanfi | |
| 5,643,146 A | 7/1997 | Stark et al. | |
| D384,115 S | 9/1997 | Wilkinson et al. | |
| 5,669,773 A | 9/1997 | Gluck | |
| 5,689,285 A | 11/1997 | Asher | |
| 5,690,582 A | 11/1997 | Ulrich et al. | |
| 5,713,794 A | 2/1998 | Shimojima et al. | |
| 5,716,274 A | 2/1998 | Goto et al. | |
| 5,721,566 A | 2/1998 | Rosenberg et al. | |
| 5,782,639 A * | 7/1998 | Beal | 434/29 |
| 5,785,630 A | 7/1998 | Bobick et al. | |
| D397,164 S | 8/1998 | Goto | |
| 5,792,031 A | 8/1998 | Alton | |
| 5,805,138 A * | 9/1998 | Brawne et al. | 345/156 |
| 5,813,958 A | 9/1998 | Tomita | |
| 5,829,982 A | 11/1998 | Advani et al. | |
| D402,317 S | 12/1998 | Goto | |
| 5,853,326 A | 12/1998 | Goto et al. | |
| 5,854,622 A | 12/1998 | Brannon | |
| 5,889,507 A | 3/1999 | Engle et al. | |
| D407,758 S | 4/1999 | Isetani et al. | |
| 5,890,995 A | 4/1999 | Bobick et al. | |
| 5,897,469 A | 4/1999 | Yalch | |
| 5,901,612 A | 5/1999 | Letovsky | |
| 5,904,639 A | 5/1999 | Smyser et al. | |
| D411,258 S | 6/1999 | Isetani et al. | |
| 5,921,899 A | 7/1999 | Rose | |
| 5,929,782 A | 7/1999 | Stark et al. | |
| 5,947,824 A | 9/1999 | Minami et al. | |
| 5,973,679 A | 10/1999 | Abbott et al. | |
| 5,980,256 A | 11/1999 | Carmein | |
| 5,989,157 A | 11/1999 | Walton | |
| D421,070 S | 2/2000 | Jang et al. | |
| 6,037,927 A | 3/2000 | Rosenberg | |
| 6,038,940 A | 3/2000 | Rosheim | |
| 6,044,772 A | 4/2000 | Gaudette et al. | |
| 6,050,822 A | 4/2000 | Faughn | |
| 6,086,518 A | 7/2000 | MacCready, Jr. | |
| 6,102,832 A | 8/2000 | Tani | |
| 6,106,301 A | 8/2000 | Merril | |
| D431,051 S | 9/2000 | Goto | |
| 6,123,647 A | 9/2000 | Mitchell | |
| 6,147,674 A | 11/2000 | Rosenberg et al. | |
| 6,152,854 A | 11/2000 | Carmein | |
| D434,769 S | 12/2000 | Goto | |
| D434,770 S | 12/2000 | Goto | |
| 6,203,432 B1 | 3/2001 | Roberts et al. | |
| 6,210,286 B1 | 4/2001 | Ohara et al. | |
| 6,216,547 B1 | 4/2001 | Lehtovaara | |
| D441,369 S | 5/2001 | Goto | |
| 6,228,000 B1 | 5/2001 | Jones | |
| 6,231,444 B1 | 5/2001 | Goto et al. | |
| 6,244,988 B1 * | 6/2001 | Delman | 482/8 |
| D444,469 S | 7/2001 | Goto | |
| 6,296,595 B1 | 10/2001 | Stark et al. | |
| 6,325,767 B1 | 12/2001 | Wolff et al. | |
| 6,330,837 B1 | 12/2001 | Charles et al. | |
| 6,353,427 B1 | 3/2002 | Rosenberg | |
| 6,355,048 B1 | 3/2002 | Hong et al. | |
| 6,359,613 B1 | 3/2002 | Poole | |
| D456,410 S | 4/2002 | Ashida | |
| D456,854 S | 5/2002 | Ashida | |
| D457,570 S | 5/2002 | Brinson | |
| 6,388,655 B1 | 5/2002 | Leung | |
| 6,394,905 B1 | 5/2002 | Takeda et al. | |
| 6,406,408 B1 | 6/2002 | Price, II | |
| D459,727 S | 7/2002 | Ashida | |
| D460,506 S | 7/2002 | Tamminga et al. | |
| D462,683 S | 9/2002 | Ashida | |
| 6,482,010 B1 | 11/2002 | Marcus et al. | |
| 6,514,145 B1 | 2/2003 | Kawabata et al. | |
| D471,594 S | 3/2003 | Nojo | |
| 6,547,702 B1 | 4/2003 | Heidecke | |
| 6,563,487 B2 | 5/2003 | Martin et al. | |
| 6,568,334 B1 | 5/2003 | Gaudette et al. | |
| 6,612,170 B2 | 9/2003 | Brown | |
| 6,616,579 B1 | 9/2003 | Reinbold et al. | |
| 6,624,802 B1 | 9/2003 | Klein et al. | |
| 6,636,161 B2 | 10/2003 | Rosenberg | |
| 6,642,857 B1 | 11/2003 | Schediwy et al. | |
| 6,663,058 B1 | 12/2003 | Peterson et al. | |
| 6,676,569 B1 | 1/2004 | Radow | |
| 6,693,622 B1 | 2/2004 | Shahoian et al. | |
| 6,722,888 B1 | 4/2004 | Macri et al. | |
| 6,726,566 B2 | 4/2004 | Komata | |
| 6,733,293 B2 | 5/2004 | Baker et al. | |
| 6,743,154 B2 | 6/2004 | Epstein | |
| 6,770,040 B2 | 8/2004 | Perner et al. | |
| 6,774,885 B1 | 8/2004 | Even-Zohar | |
| D500,100 S | 12/2004 | van der Meer | |
| 6,859,198 B2 | 2/2005 | Onodera et al. | |
| 6,888,076 B2 | 5/2005 | Hetherington | |
| 6,897,779 B2 | 5/2005 | Nishitani et al. | |
| 6,902,513 B1 | 6/2005 | McClure | |
| D510,391 S | 10/2005 | Merril et al. | |
| 6,975,302 B1 | 12/2005 | Ausbeck, Jr. | |
| 6,991,483 B1 | 1/2006 | Milan et al. | |

| | | |
|---|---|---|
| D514,627 S | 2/2006 | Merril et al. |
| 6,994,627 B2 | 2/2006 | Menosky et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,039,866 B1 | 5/2006 | Rosenberg et al. |
| 7,083,546 B2 | 8/2006 | Zillig et al. |
| 7,121,982 B2 | 10/2006 | Feldman |
| 7,125,388 B1 | 10/2006 | Reinkensmeyer et al. |
| 7,139,983 B2 | 11/2006 | Kelts |
| 7,158,118 B2 | 1/2007 | Liberty |
| 7,160,233 B2 | 1/2007 | Perez |
| 7,198,590 B1 | 4/2007 | Nicholas |
| 7,262,760 B2 | 8/2007 | Liberty |
| 7,331,226 B2 | 2/2008 | Feldman et al. |
| 7,335,134 B1 * | 2/2008 | LaVelle .................... 482/1 |
| 7,414,611 B2 | 8/2008 | Liberty |
| 7,530,929 B2 | 5/2009 | Feldman et al. |
| 2001/0018363 A1 | 8/2001 | Goto et al. |
| 2002/0022551 A1 | 2/2002 | Watterson et al. |
| 2002/0055424 A1 | 5/2002 | Brown |
| 2002/0080115 A1 | 6/2002 | Onodera et al. |
| 2002/0185041 A1 | 12/2002 | Herbst |
| 2003/0033885 A1 | 2/2003 | Knox et al. |
| 2003/0069108 A1 | 4/2003 | Kaiserman et al. |
| 2003/0119638 A1 | 6/2003 | Chan |
| 2003/0171190 A1 | 9/2003 | Rice |
| 2003/0193416 A1 | 10/2003 | Ogata et al. |
| 2003/0228902 A1 | 12/2003 | Walker et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0097336 A1 | 5/2004 | Chuang |
| 2004/0097337 A1 | 5/2004 | Chuang |
| 2004/0099513 A1 | 5/2004 | Hetherington |
| 2004/0110602 A1 | 6/2004 | Feldman |
| 2004/0180719 A1 | 9/2004 | Feldman et al. |
| 2004/0214639 A1 | 10/2004 | Makuta |
| 2004/0259688 A1 | 12/2004 | Stabile |
| 2005/0049116 A1 | 3/2005 | Huang |
| 2005/0070154 A1 | 3/2005 | Milan |
| 2005/0130742 A1 | 6/2005 | Feldman et al. |
| 2006/0046849 A1 | 3/2006 | Kovacs |
| 2006/0097453 A1 | 5/2006 | Feldman et al. |
| 2006/0111181 A1 | 5/2006 | Thorsen |
| 2006/0132433 A1 | 6/2006 | Kramer et al. |
| 2006/0139317 A1 | 6/2006 | Leu et al. |
| 2006/0190823 A1 | 8/2006 | Cunningham et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0260395 A1 | 11/2006 | Feldman et al. |
| 2007/0066394 A1 | 3/2007 | Ikeda et al. |
| 2007/0072680 A1 | 3/2007 | Ikeda |
| 2007/0155589 A1 | 7/2007 | Feldman et al. |
| 2007/0219050 A1 | 9/2007 | Merril |
| 2007/0298883 A1 | 12/2007 | Feldman et al. |
| 2008/0146336 A1 | 6/2008 | Feldman et al. |

FOREIGN PATENT DOCUMENTS

| | | |
|---|---|---|
| JP | 11309270 | 9/1999 |
| JP | 2002095710 | 4/2002 |
| JP | 2002126019 | 5/2002 |
| WO | 9111221 | 8/1991 |
| WO | 0057387 A1 | 9/2000 |
| WO | 2007062237 A2 | 5/2007 |

OTHER PUBLICATIONS

"Nintendo E3 2007- Wii Fit", http://e3nin.nintendo.com/wii_fit.html, retrieved from Internet Aug. 27, 2007.

Justin McElroy, "WiiFit Gonna Make You Sweat- Joystiq", http://www.joystiq.com/2007/07/11/wiifit-gonna-make-you-sweat/, Jul. 11, 2007.

Tom Dang et al., "Interactive Video Exercise System for Pediatric Brain Injury Rehabilitation," Proceedings of the RESNA 20th Annual Conference, Jun. 1998; 3 pages.

"Innovation in Action," Biofeedback Motor Control GmbH; 2 pages.

Glas, V, "Chair Puts Player on the Joystick," Machine Design; Penton, Inc., vol. 63, No. 21, Oct. 24, 1991, p. 73.

"AGH's Atari Project Puffer Page," http://www.atarihq.com/othersec/puffer/index.html, retrieved from the internet on Sep. 19, 2002, 4 pages.

"The Legible City," www.jeffrey-shaw.net, retrieved from the internet on Sep. 19, 2002, 3 pages.

Antonoff, M, "Living in a Virtual World," Popular Science, Jun. 1993, 2 pages.

Antonoff, M, "Virtual Violence: Boxing without Bruises," Popular Science, Apr. 1993, 1 page.

Brown, S, "Video Cycle Race," Popular Science, May 1989, 1 page.

"Military: Arcade Aces," Popular Mechanics, Mar. 1982, 1 page.

"Suncom Aerobics Joystick," www.atarihq.com, Retreived from Internet Sep. 19, 2002, 1 page.

Aukstakalnis, et al., "The Art and Science of Virtual Reality: Silicon Mirage," pp. 197-205.

Hamit, F., "Virtual Reality and the Exploration of Cyberspace," Jun. 1, 1993, 4 pages.

"The Race Begins with $85," Randal Sports, 1990, 1 page.

"The New Exertainment System," Life Fitness, 1995, 1 page.

"The History of Nintendo (1889-1997)," Retrieved from Internet Aug. 24, 1998, pp. 1 and 9-10.

Skorupa, J., "Virtual Fitness," Sports Science, Popular Mechanics, Oct. 1994, 3 pages.

Manning R., "Videogame Players Get a Workout with the Exertainment," The Courier-Journal Sep. 25, 1994, 1 page.

Shah, "Mad Catz Universal MC2 Racing Wheel," Feb. 18, 2005.

"Universal S-Video/Audio Cable," Retrieved from the Internet, www.madcatz.com.

* cited by examiner

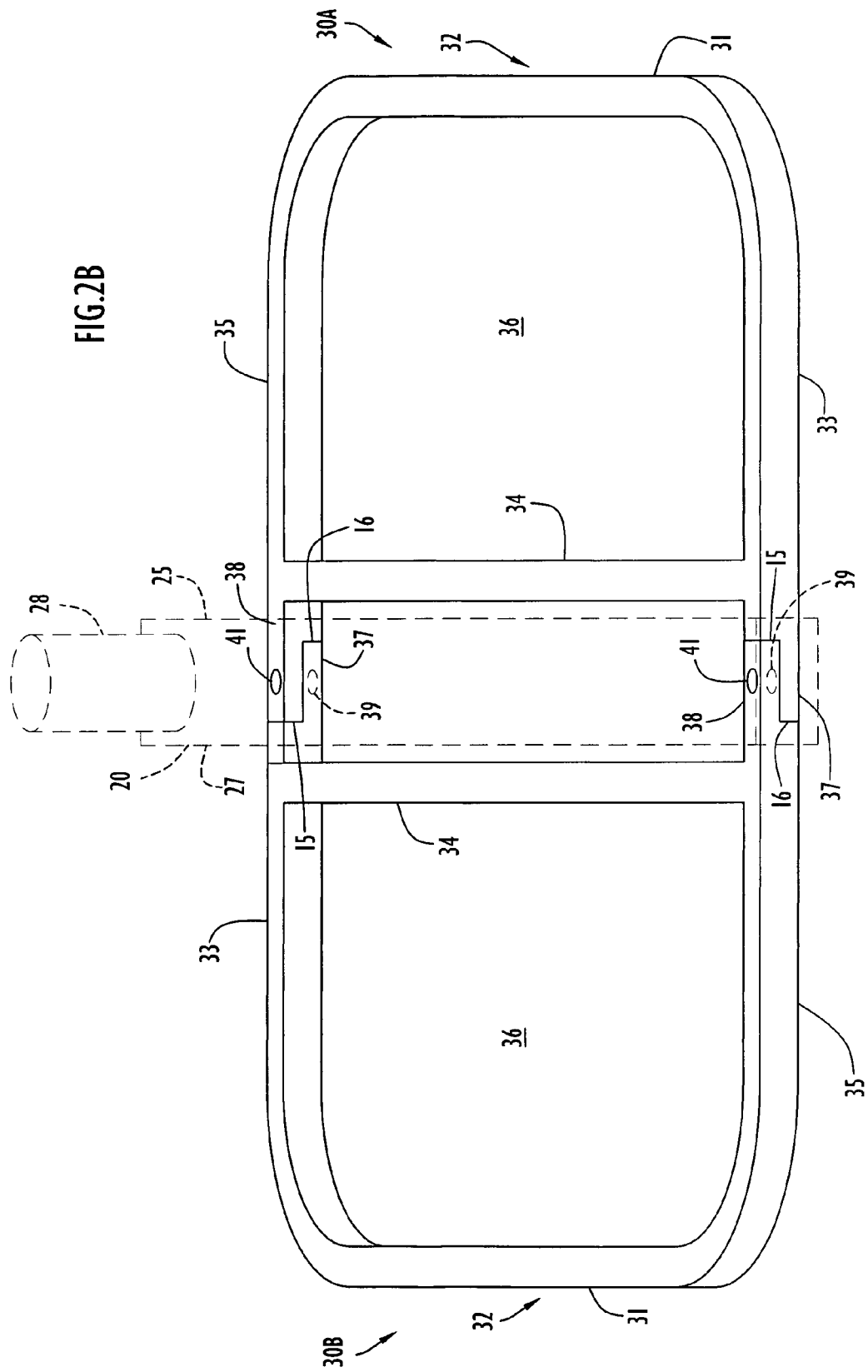

ISOMETRIC EXERCISE SYSTEM AND METHOD OF FACILITATING USER EXERCISE DURING VIDEO GAME PLAY

CROSS-REFERENCE TO RELATED APPLICATIONS

This application is a Continuation-In-Part of U.S. patent application Ser. No. 10/975,185, entitled "Configurable Game Controller and Method of Selectively Assigning Game Functions to Controller Input Devices" and filed Oct. 28, 2004, now abandoned which is a Continuation-In-Part of U.S. patent application Ser. No. 10/806,280, entitled "Game Controller Support Structure and Isometric Exercise System and Method of Facilitating User Exercise During Game Interaction" and filed Mar. 23, 2004, now abandoned which is a Continuation-In-Part of U.S. patent application Ser. No. 10/309,565, entitled "Computer Interactive Isometric Exercise System and Method for Operatively Interconnecting the Exercise System to a Computer System for Use as a Peripheral" and filed Dec. 4, 2002 now U.S. Pat. No. 7,121,982. Moreover, U.S. patent application Ser. Nos. 10/975,185 and 10/806,280 further claim priority from U.S. Provisional Patent Application Ser. No. 60/514,897, entitled "Configurable Game Controller and Method of Selectively Assigning Game Functions to Controller Input Devices" and filed Oct. 29, 2003. In addition, the present application claims priority from U.S. Provisional Patent Application Ser. No. 60/699,384, entitled "Isometric Exercise System and Method of Facilitating User Exercise During Video Game Play" and filed Jul. 15, 2005. The disclosures of the above-identified patent applications are incorporated herein by reference in their entireties.

BACKGROUND OF THE INVENTION

1. Technical Field

The present invention relates to game controllers and exercise systems of the types disclosed in the aforementioned patent applications and U.S. patent application Ser. Nos. 11/133,449, entitled "Force Measurement System for an Isometric Exercise Device" and filed May 20, 2005; and Ser. No. 11/097,370, entitled "Game Controller Connection System and Method of Selectively Connecting a Game Controller with a Plurality of Different Video Gaming Systems" and filed Apr. 4, 2005. The disclosures of these patent applications are incorporated herein by reference in their entireties. In particular, the present invention pertains to an isometric exercise device serving as a controller for video games to enable users to exercise during game play.

2. Discussion of Related Art

Currently, a wide variety of different types of exercise devices are commonly utilized to promote health and fitness, particularly for people having sedimentary lifestyles and/or work environments, and to provide rehabilitation for particular types of injuries. The vast majority of these exercise devices utilize isokinetic and/or isotonic forms of exercise during operation, where a user's muscles are moved under resistance through a selected range of motion.

Isometric exercise is another effective form of muscular exercise that is very useful for rehabilitation, fitness and/or training. For example, isometric training is useful for fighter jet pilots who perform isometric muscular contractions of the lower limbs and body core during flights to prevent blackouts when subjected to high gravitational forces. Isometric exercise involves the exertion of force by a user against an object that significantly resists movement as a result of the exerted force such that there is substantially minimal or no movement of the user's muscles during the force exertion. Examples of simple forms of isometric exercise include pushing against a stationary surface (e.g., a doorframe or a wall), attempting to pull apart tightly gripped hands or to bend or flex a sufficiently rigid steel bar, etc. Due to their inherently tedious nature, isometric exercise devices are less popular and, accordingly, are limited in type and availability, in comparison to more conventional forms of isotonic and isokinetic exercise devices.

In an attempt to overcome the aforementioned problems, the related art provides various exercise systems. For example, International Publication No. WO 91/11221 (Bond et al.) describes a computer controlled exercise system that sequentially and automatically implements isokinetic, isotonic and isometric exercises to permit a physical therapist to attend to other patients while the computer interacts with the patient to effect a desired therapy. In one embodiment, the motion of a patient's body, such as lifting or twisting the patient's limb, is converted into a runner on a display that competes against another runner. If the patient meets or exceeds the exercise goals, such as a number of repetitions or torque applied to the exercise unit, then the runner representing the patient will match or beat the other runner representing the goal.

Further, an Interactive Video Exercise System (IVES) is disclosed in Dang et al. "Interactive Video Exercise System for Pediatric Brain Injury Rehabilitation", Proceedings of the RESNA 20$^{th}$ Annual Conference, June 1998. This system provides an instrumented video-game-enhanced exercise program for pediatric brain injury patients, where the system includes an isometric test apparatus, a data processing circuit box, and a SUPER NES system with an adapted game controller. The isometric test apparatus includes a first load cell rigidly mounted onto a metal cross-bar that clamps to two rear legs of a chair. A high tensile cable and an ankle band couple the shank of a subject sitting in the chair to the first load cell. A second load cell is mounted between two aluminum plates which rest on the floor. The subject's foot rests on the top plate against a heel stop and is secured with two straps. Isometric extensions of the subject's knee are measured by the first load cell, and isometric ankle dorsiflexion of the subject is measured by the second load cell. The signal from either load cell is transmitted to the data processing box, where it is processed and compared with a variable threshold value set by a potentiometer. When the transducer's signal exceeds the threshold value, voltage is passed to the adapted game controller whereby the selected operation is executed in a game (e.g., move right, move left, move up, move down, etc.). As a result, the subject can only play the game by performing certain isometric exercises.

However, the above-described exercise systems of the related art suffer from several disadvantages. In particular, interaction between the exercise system and a computer in the previously described International Publication is limited to simple representations on a display that are based upon achieving set goals. Thus, this exercise system does not provide a fully interactive virtual reality environment (e.g., controlling a variety of movements of a character or an object in the scenario as well as other features relating to the scenario), thereby offering limited entertainment during user exercise that may be insufficient to maintain user interest for exercise. Further, the system is generally not universally compatible with various gaming or other processors and associated "off the shelf" gaming or other applications. This limits the applications for which the system may be utilized. In addition, the system is bulky and includes various components for operation, thereby complicating portability and use for exercise at various locations.

Moreover, the previously described IVES system requires a game controller for a SUPER NES system to be adapted to render the system operable. Thus, the system is generally not universally compatible with various gaming or other processors and associated "off the shelf" gaming or other applications. This limits the applications for which the system may be utilized. Further, the system includes various components requiring assembly for operation, thereby complicating portability and use for exercise at various locations and preventing immediate (e.g., plug and play type) operation. In addition, the IVES system is limited to isometric knee and ankle exercises and, thus, is incapable of being utilized in a variety of different contexts where it is desirable to exercise upper body parts alone or in combination with lower body parts of a user.

OBJECTS AND SUMMARY OF THE INVENTION

Accordingly, it is an object of the present invention to control gaming or other virtual reality scenarios in accordance with user exercise.

It is another object of the present invention to control gaming or other virtual reality scenarios in accordance with isometric exercises performed by a user.

Yet another object of the present invention is to utilize a universally compatible isometric exercise system with a wide variety of computer systems capable of executing "off the shelf" games or other software programs, where the compatibility of the system enables immediate (e.g., plug and play type) operation.

Still another object of the present invention is to provide a compact, portable and lightweight isometric exercise system compatible with various gaming or other processors to enable control of gaming or other applications in accordance with user exercise at various locations.

The aforesaid objects are achieved individually and/or in combination, and it is not intended that the present invention be construed as requiring two or more of the objects to be combined unless expressly required by the claims attached hereto.

According to the present invention, an isometric exercise system serving as a peripheral to facilitate user interaction with a host computer system includes at least one effector, at least one sensor coupled to the effector, a platform to accommodate the user and control circuitry including a processor. The system is compact, lightweight and portable to enable user exercise at various locations. The platform accommodates a user in a seated position and includes the effector attached thereto. The sensor measures at least one force applied by a user to the effector, where the applied force effects a strain on or deflects the effector. The effector may be in the form of a metal rod, where the user applies force (e.g., bending, twisting, tension, compressive forces, etc.) that slightly and measurably deforms the effector within its elastic limit. The processor receives and processes data corresponding to applied force information measured by the sensor for transference to the host computer system, where the processed data is transferred in a format compatible with the host computer system and facilitates user interaction with the host computer system via effector manipulation by the user. The host computer system processes the information to update or respond to events within an executing software application (e.g., a game).

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 2B is an exploded view in perspective of the interconnection of support platforms with a base of the exercise device of FIG. 1.

DETAILED DESCRIPTION OF THE PREFERRED EMBODIMENTS

Figure 1:
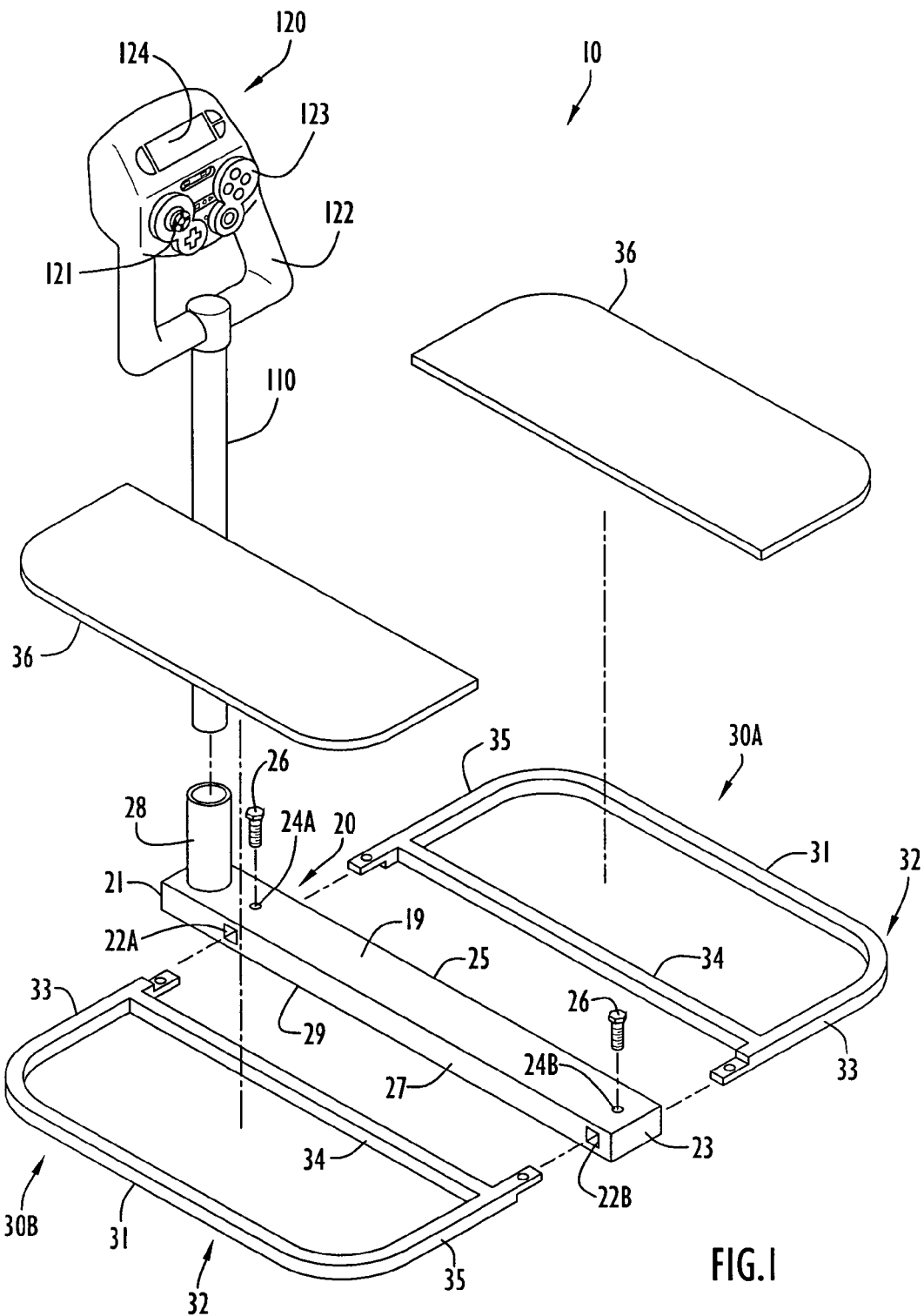
FIG. 1 is an exploded view in perspective of an exercise device according to the present invention.
Figure 3:
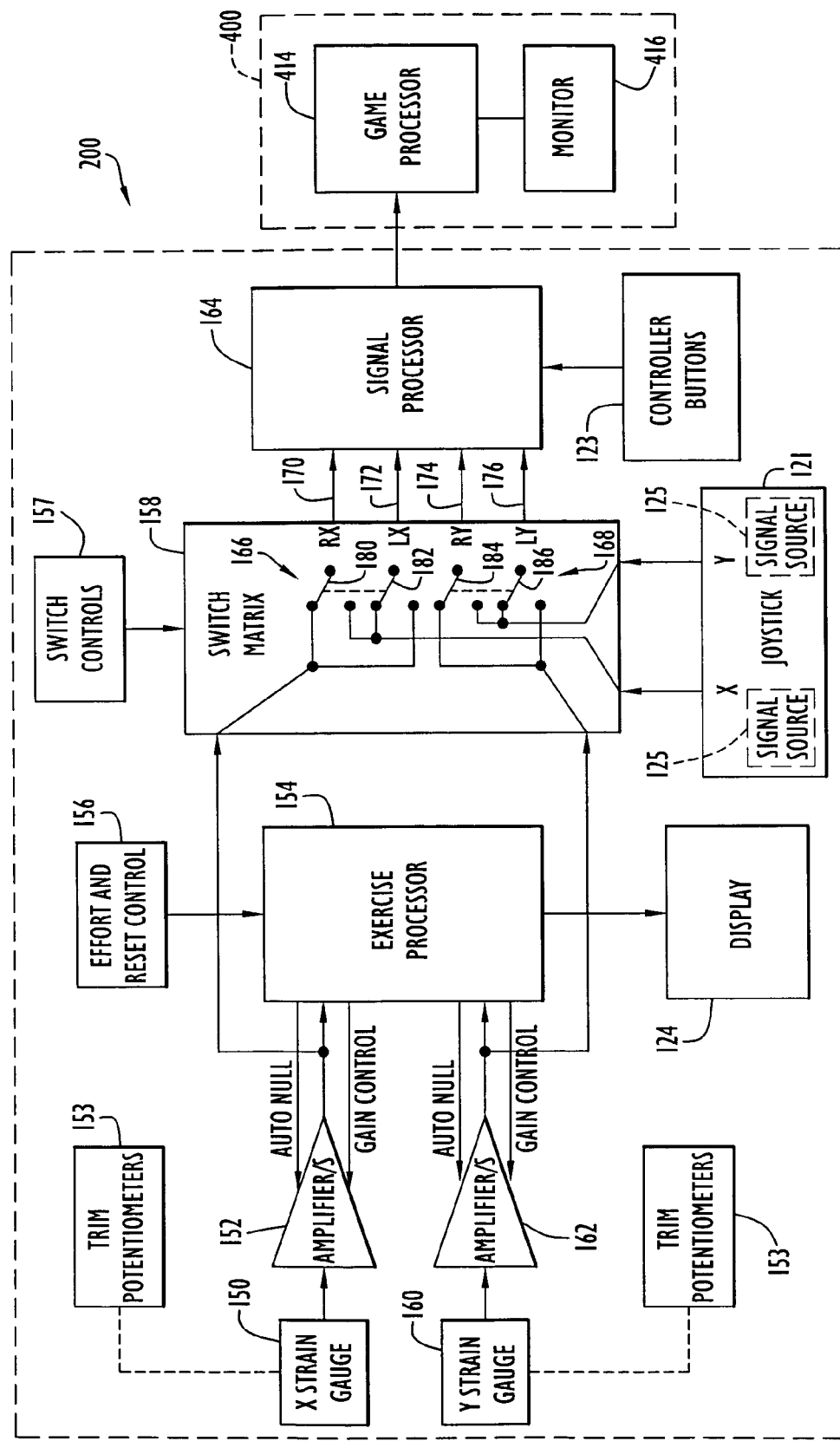
FIG. 3 is a schematic block diagram of an exemplary control circuit for the exercise device of FIG. 1.
Figure 4:
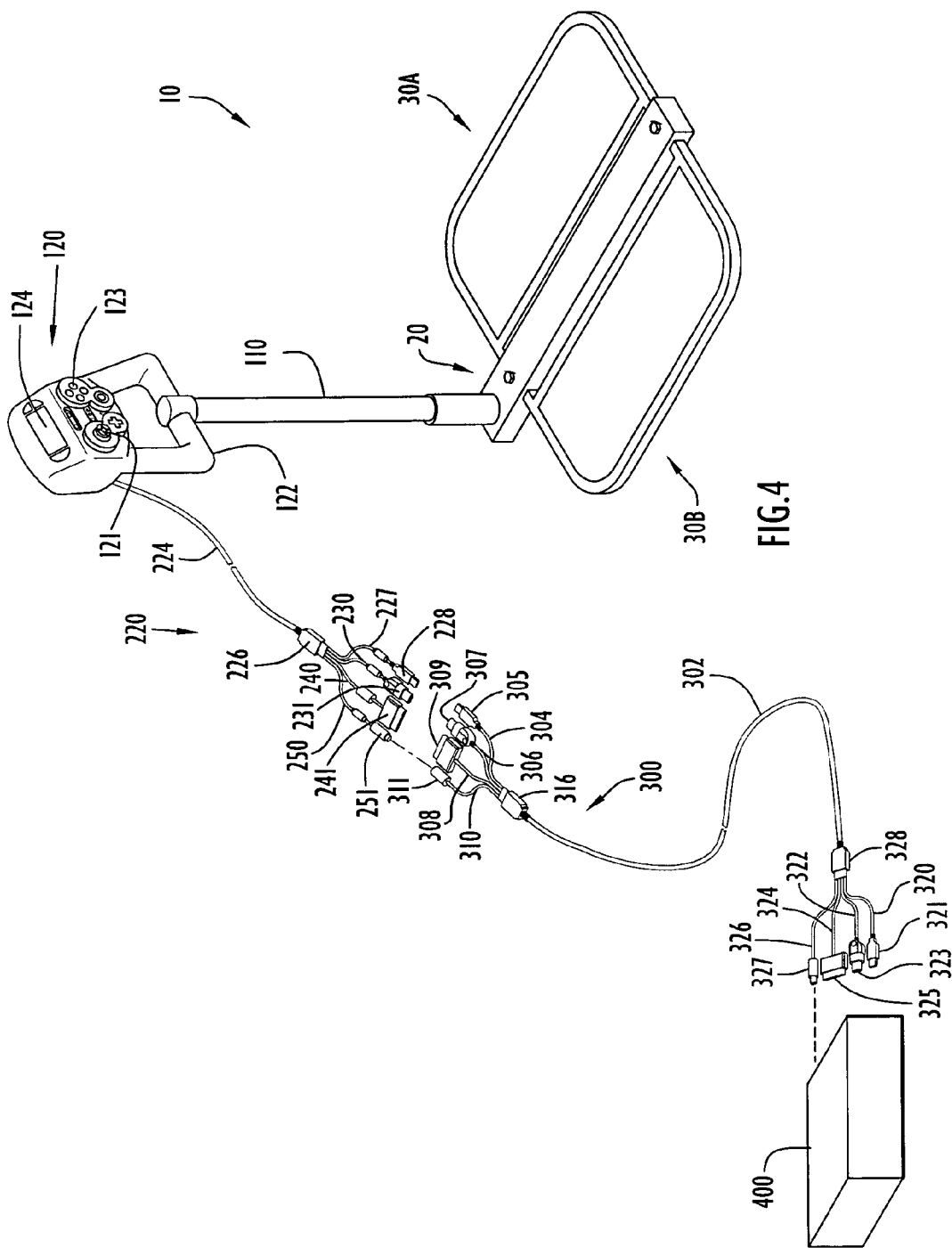
FIG. 4 is a view in perspective of the exercise device of FIG. 1 coupled to a video game system.

An exercise device according to the present invention is illustrated in FIGS. 1 and 4. Initially, an exercise device 10 according to the present invention is preferably coupled to a gaming system 400. The gaming system typically includes a game processor 414 (FIG. 3) and a monitor or display 416. The game processor includes a storage drive and/or unit to receive computer readable media (e.g., CD, DVD, etc.) containing software for various games and a processing device to execute the software to provide games on the monitor. The gaming system may be implemented by any conventional or other processing or gaming system (e.g., microprocessor system, personal computer, video gaming system, etc.). For example, the gaming system may be implemented by conventional video games, such as PS2 available from Sony, XBOX available from Microsoft or GAMECUBE available from Nintendo.

The games generally include characters or objects that are controlled by a user via a controller. For example, the user may control movement and actions of a character or a vehicle (e.g., car, airplane, boat, etc.) to move through a virtual environment displayed on the monitor. The controller includes a plurality of input devices (e.g., joystick, buttons, etc.) to enable a user to interact with the game. The gaming system receives signals from the controller and updates the display to reflect the movements and/or actions of the character or object as indicated by user manipulation of the controller.

Exercise device 10 serves as a game controller and enables a user to perform isometric exercises to control the game scenario. The exercise device is typically configured to be compact, portable and lightweight, preferably including a weight less than seventeen pounds. In particular, device 10 includes a base 20, support platforms 30a, 30b, an effector bar 110 and a controller 120. Base 20 is in the form of a substantially rectangular bar with front and rear surfaces 21, 23, side surfaces 25, 27 and top and bottom surfaces 19, 29. The base includes a substantially cylindrical receptacle 28 attached to the base top surface proximate base front surface 21 and extending upward therefrom. The receptacle includes dimensions suitable to receive effector bar 110 therein. By way of example only, base 20 includes a length or longitudinal dimension of approximately eighteen inches, a width or transverse dimension of approximately two inches and a height or depth of approximately one inch, while receptacle 28 includes a height of approximately four inches. However, the base and receptacle may be of any shape or size and include any suitable dimensions. Base 20 includes a series of channels 22a, 22b defined therein and respectively positioned toward a corresponding base front and rear surface. The channels extend transversely through the base between side surfaces 25, 27 and enable the base to engage support platforms 30a, 30b as described below.

Figure 2A:
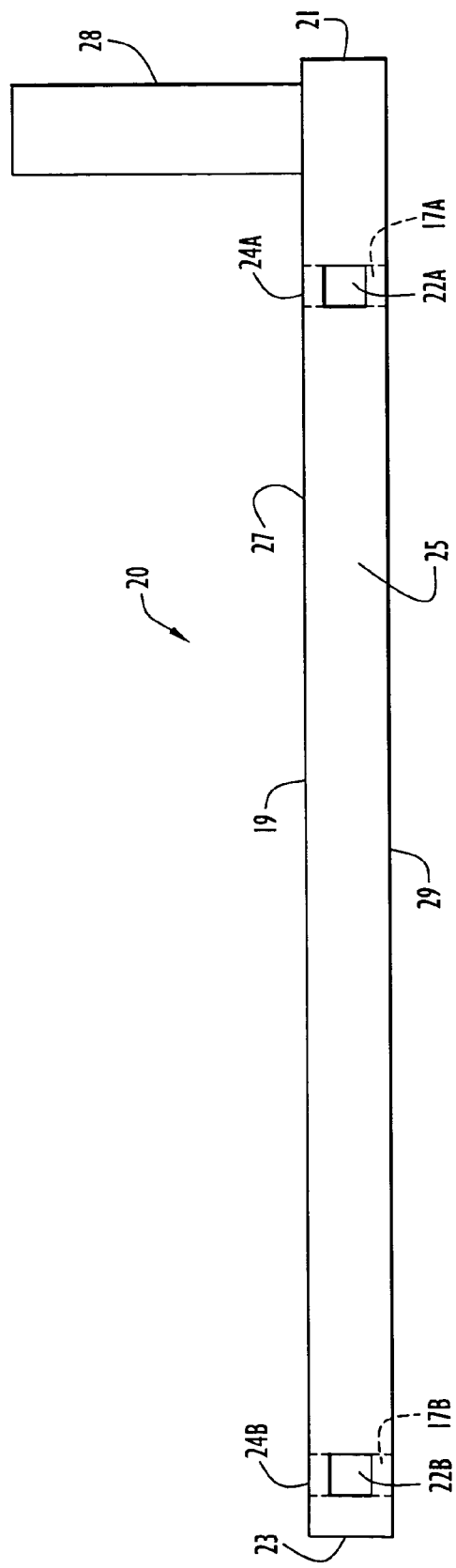
FIG. 2A is side view in elevation of the base of the exercise device of FIG. 1.

Referring to FIGS. 1 and 2A, openings 24a, 24b are respectively defined in the base top surface toward base front surface 21 and base rear surface 23 substantially coincident a corresponding channel 22a, 22b. Threaded recesses 17a, 17b are defined in a base lower portion (proximate bottom surface 29) below respective channels 22a, 22b and substantially coincident corresponding openings 24a, 24b. Openings 24a, 24b and recesses 17a, 17b each include dimensions sufficient to accommodate a corresponding threaded bolt 26. The threads of the bolt are configured to engage the threads of recesses 17a, 17b to removably secure support platforms 30a, 30b to the base as described below.

With reference to FIGS. 1 and 2B, support platform 30a includes a generally 'U'-shaped frame member 32 and a frame bar 34. Frame member 32 includes a support bar 31 with arms 33, 35 extending substantially in parallel from respective ends of the support bar to form the generally 'U'-shape. Frame bar 34 is attached to the distal portions of arms 33, 35 and extends between those arms across the open portion of generally 'U'-shaped frame member 32. The arms and frame bar define an area within support platform 30a to receive a plate 36 therein. The plate includes a shape and dimensions sufficient to occupy and fit within that area. The plate is preferably constructed of a plastic material (e.g., ABS, PVC, etc.), but may be constructed of any suitable materials (e.g., wood, metal, plastic, fiberglass, etc.). By way of example only, support platform 30a includes a length or longitudinal dimension of approximately fourteen inches, a width or transverse dimension of approximately seven and one-half inches and a depth or thickness of approximately 0.5 inches, while plate 36 includes a length or longitudinal dimension of approximately fourteen inches, a width or transverse dimension of approximately six and one-half inches and a depth or thickness of approximately 0.25 inches. However, the support platform and plate may be of any shape or size and include any suitable dimensions.

Arm 33 includes a shoulder or step 15 distally of frame bar 34, where the arm upper portion is tapered distally of the shoulder to form a projection 37. A threaded opening 39 is defined through projection 37 to receive and engage bolt 26 as described below. Similarly, arm 35 includes a step or shoulder 16 distally of frame bar 34, where the arm lower portion is tapered distally of the shoulder to form a projection 38. This projection includes an opening 41 defined therethrough to receive bolt 26 as described below. By way of example only, projections 37, 38 include a length or longitudinal dimension of approximately one inch and a width or transverse dimension of approximately one inch. However, the projections may be of any shape or size and include any suitable dimensions. Support platform 30b is substantially similar to support platform 30a described above.

Support platform 30a is disposed proximate base side surface 25, while support platform 30b is disposed proximate base side surface 27. The support platforms are oriented in an inverted fashion with respect to each other. Projection 37 of support platform 30b is inserted within channel 22a of the base from side surface 27 with projection 38 of support platform 30a being inserted within that channel from side surface 25. Projection 37 of support platform 30b is disposed within channel 22a below projection 38 of support platform 30a, where openings 39, 41 of the projections, opening 24a of the base and recess 17a are aligned with each other to form a passage to receive bolt 26. The bolt is disposed through the passage with the bolt threads engaging the threads of projection opening 39 and recess 17a to secure the support platforms to the front portion of the base.

Similarly, projection 37 of support platform 30a is inserted within channel 22b of the base from side surface 25 with projection 38 of support platform 30b being inserted within that channel from side surface 27. Projection 37 of support platform 30a is disposed within channel 22b below projection 38 of support platform 30b, where openings 39, 41 of the projections, opening 24b of the base and recess 17b are aligned with each other to form a passage to receive bolt 26. The bolt is disposed through the passage with the bolt threads engaging the threads of projection opening 39 and recess 17b to secure support platforms 30a, 30b to the rear portion of the base. The support platforms may be removed from the base by withdrawing bolts 26 from openings 24a, 24b and removing the respective projections 37, 38 of support platforms 30a, 30b from base channels 22a, 22b.

Referring back to FIGS. 1 and 4, effector bar 110 is received within receptacle 28 in a substantially upright position. The effector bar is constructed of a suitably rigid material (e.g., a metal alloy) that is capable of being slightly deflected within its elastic limit in response to any combination of bending, twisting, tension and compression forces applied by the user to the bar. While the effector bar is generally cylindrical, it is noted that the effector bar may be of any suitable shape (e.g., bent or curved, V-shaped, etc.) and have any suitable exterior surface geometries (e.g., curved, multifaceted, etc.). A lock mechanism (not shown) may be employed to adjust the position of the effector bar within receptacle 28 in accordance with user characteristics (e.g., height, reach, etc.).

A controller 120 is attached or secured to the effector bar upper portion. The controller is of the type available for conventional video games (e.g., PS2 available from Sony, XBOX available from Microsoft, GAMECUBE available from Nintendo, video gaming applications configured for use with personal computer operating systems such as Microsoft WINDOWS and Apple Mac OS X, etc.), such as the device described in U.S. Pat. No. 6,231,444, and is similar to the controllers disclosed in the aforementioned patent applications. The controller typically includes a series of buttons 123 and a joystick 121 disposed on the controller upper portion. The joystick and effector bar may be selectively configured or assigned to game functions as described below. Basically, effector bar 110 serves the function of a second controller joystick with respect to a game. The controller generally includes respective signal sources (e.g., variable resistor or potentiometers) to provide signals indicating joystick motion along X (e.g., left/right motions) and Y (e.g., forward/back motions) axes. For example, joystick 121 (FIG. 3) may be associated with signal sources 125 (e.g., variable resistor or potentiometers) to provide signals indicating joystick motion along X and Y axes. However, the controller may include any quantity of any type of input devices (e.g., buttons, switches, a keypad, joystick, etc.) and signal sources disposed at any location and arranged in any fashion on the controller. The buttons and joystick may be utilized to enter any desired information (e.g., enter desired user actions for the game, etc.). Further, the controller may include input devices 156 (FIG. 3) to enter and reset resistance controls and reset clock or other functions, and input devices 157 to control function assignment of controller input devices as described below. Devices 156, 157 may be implemented by any conventional or other input devices (e.g., buttons, slides, switches, etc.). The controller lower portion includes a generally "U"-shaped handle or grip 122 for engagement by a user.

Effector bar 110 includes at least one sensor to measure at least one type of strain applied by the user to that bar. Preferably, effector bar 110 includes strain gauge sensors 150, 160 (FIG. 3) that are arranged at suitable locations on the bar, preferably on the effector bar lower portion near receptacle 28. These sensors measure the amount of a strain deformation applied to the bar as a result of the user applying pushing, pulling or lateral forces to the controller handle. By way of example only, sensor 150 may measure force applied to the effector bar along an X-axis (e.g., lateral or left/right forces), while sensor 160 may measure forces applied to the effector bar along a Y-axis (e.g., push/pull or forward/backward forces).

Figure 2C:
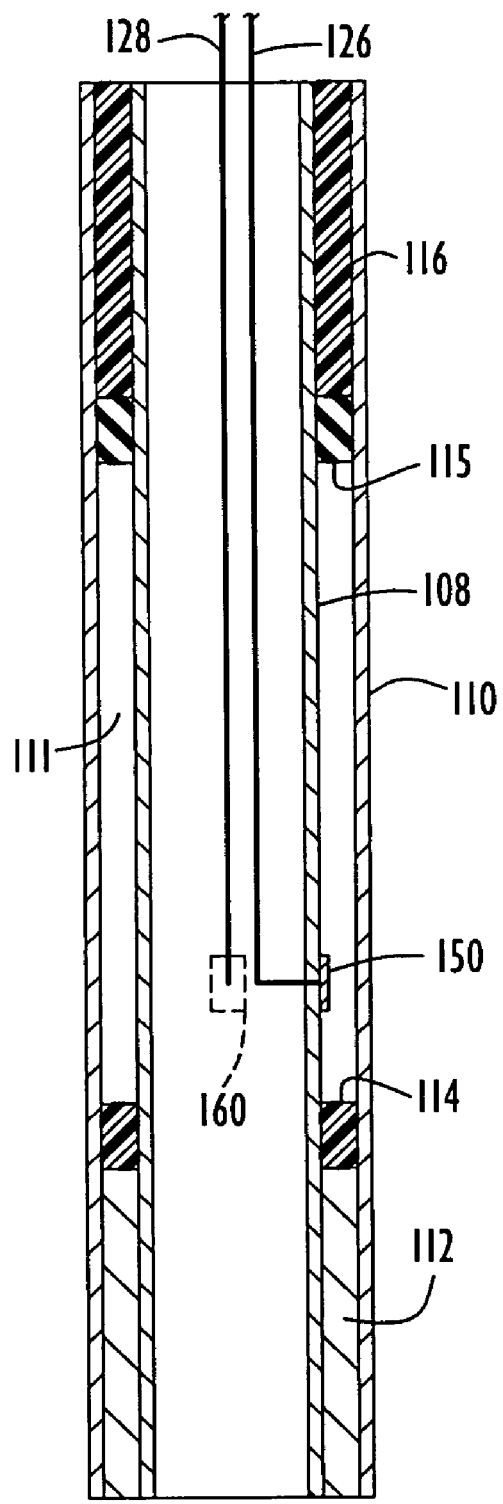
FIG. 2C is a side view in cross-section of the effector bar of the exercise device of FIG. 1.

The sensors may be arranged with respect to the effector bar in any suitable manner to measure forces, such as the manners disclosed in the aforementioned patent applications. For example, the sensors may be attached directly or indirectly to an effector bar exterior or interior surface to measure the applied forces. Preferably, sensors 150, 160 are secured to a gauge mounting structure disposed within the effector bar in a manner similar to that disclosed in aforementioned U.S. patent application Ser. No. 11/133,449. Referring to FIG. 2C, a gauge mounting structure 108 is secured within the hollow interior and extends substantially the length of effector bar 110. The effector bar preferably includes at least one open end to facilitate insertion of the gauge mounting structure within the effector bar during assembly. The mounting structure is preferably an elongated hollow tube and has a transverse cross-sectional dimension (e.g., the outer diameter of the internal mounting structure) less than the transverse cross-sectional dimension of the effector bar (e.g., the internal diameter of the effector bar). Thus, an annular gap 111 exists between effector bar 110 and gauge mounting structure 108 nested within the effector bar.

The gauge mounting structure is preferably constructed of a suitable material capable of being slightly deformed within its elastic limit in response to any combination of bending, twisting, tension and compression forces applied to the effector bar and translated to the gauge mounting structure as described below. This material is generally more compliant and provides greater flexibility for the mounting structure in comparison to the effector bar. Specifically, when the same force is applied at substantially similar locations and directions to each of effector bar 110 and gauge mounting structure 108, the gauge mounting structure is more flexible and is capable of deforming to a slightly greater extent or degree (e.g., has a greater deformation) than the effector bar without exceeding the elastic limit of the gauge mounting structure. In an exemplary embodiment in which the effector bar is constructed of steel or other suitable metal alloy, the gauge mounting structure is preferably constructed of polyvinyl chloride (PVC) or any other suitable plastic or polymer material that is more compliant or flexible than the metal materials used to construct the effector bar.

The gauge mounting structure is stabilized within and indirectly secured along internal peripheral surface portions of the effector bar via suitable strain transfer materials preferably disposed proximate the longitudinal ends of the gauge mounting structure. The strain transfer materials facilitate transfer of forces or strains that are applied to the effector bar to the gauge mounting structure as described below. A fitting 112 (e.g., a PVC coupling) is secured at a first end of gauge mounting structure 108 that corresponds with the first end of effector bar 110 (e.g., the effector bar end that is secured within receptacle 28). Alternatively, fitting 112 may be secured at the second end of the gauge mounting structure that corresponds with the second, free end of the effector bar (e.g., the effector bar end toward controller 120).

The fitting forms a sheath around the longitudinal outer periphery of the gauge mounting structure, and has a transverse cross-sectional dimension that is slightly less than the transverse cross-sectional dimension (e.g., inner diameter) of the effector bar. In addition, the outer surface portions of the fitting frictionally engage the inner surface portions of the effector bar to provide a first indirect contact area or contact bridge between the effector bar and the gauge mounting structure at their corresponding first ends. This contact bridge serves as one strain transfer location in which forces or strains applied to the effector bar are transferred to the gauge mounting structure. A first plug 114 of hardened epoxy resin is secured within annular gap 111 at a location adjacent fitting 112. The first resin plug is secured to inner and outer peripheral surface portions of the effector bar and gauge mounting structure and to the adjacent end surface of the fitting to provide additional surface contact areas between the effector bar and the gauge mounting structure for facilitating strain transfer from the effector bar to the gauge mounting structure.

A second plug 116 of hardened epoxy resin is disposed within annular gap 111 at the corresponding second ends of effector bar 110 and gauge mounting structure 108. The second plug is secured to respective inner and outer peripheral surface portions of the effector bar and the gauge mounting structure to provide a second indirect contact area or contact bridge between the effector bar and the gauge mounting structure. This provides another location at which forces or strains applied to the effector bar are transferred to the gauge mounting structure. Second plug 116 substantially fills the annular gap from a selected location along the gauge mounting structure to the structure second end. A foam collar 115 is disposed in the annular gap and surrounds an outer peripheral surface portion of the gauge mounting structure at the selected location adjacent the second plug. The foam collar is provided to facilitate formation of the second plug of hardened epoxy resin during assembly of the effector bar.

While the strain transfer materials described above include a fitting and hardened epoxy resin, it is noted that any suitable connecting or bridging material may be provided within the annular gap formed between the effector bar and the gauge mounting structure that facilitates transfer of applied forces from the effector bar to the gauge mounting structure. For example, fittings and/or plugs of hardened epoxy resin can be secured at both opposing (e.g., first and second) ends of and/or at any other locations along the gauge mounting structure, where the fittings and/or plugs are suitably dimensioned to provide a contact or connecting bridge between corresponding inner and outer peripheral surface portions of the effector bar and the gauge mounting structure. The strain transfer materials are preferably suitably rigid to effect substantially complete transfer of forces between the effector bar and the gauge mounting structure with minimal or no absorbance of such forces by the strain transfer materials. While the preferred placement of strain transfer materials is at or near the opposing longitudinal ends of the effector bar and gauge mounting structure, the strain transfer materials may be disposed at any one or more suitable locations along the length of the effector bar depending upon a particular application.

Sensors 150, 160 are affixed at suitable locations on outer surface portions of gauge mounting structure 108 between the locations of the strain transfer materials. Preferably, the sensors are disposed at suitable locations along the gauge mounting structure where, depending upon a particular design and/or application, deformation of the effector bar and/or the gauge mounting structure will likely be the greatest or most significant. In the embodiment of FIG. 2C, sensors 150, 160 are secured on gauge mounting structure 108 at a location that is closer to the first (e.g., fixed) end (e.g., toward receptacle 28) of the gauge mounting structure in comparison to the second (e.g., free) end (e.g., toward controller 120) of the gauge mounting structure.

The sensors are further aligned in a longitudinal direction of both the effector bar and the gauge mounting structure and are angularly offset from each other by approximately ninety degrees on the outer periphery of the gauge mounting structure. In particular, the sensors are aligned to measure bending deflections of gauge mounting structure 108 (e.g., corresponding with bending deflections of effector bar 110 that have been translated to the gauge mounting structure via the strain transfer materials) along at least two separate axes. For example, the two separate axes may be a predefined X axis and a predefined Y axis, where both axes are oriented in the same plane and angularly offset from each other by approximately ninety degrees. However, it is noted that any suitable number of sensors (e.g., one or more) may be provided and suitably aligned on the gauge mounting structure to measure compression, elongation, and twisting of the gauge mounting structure based upon similar forces acting upon and transferred from the effector bar. For example, a third sensor may be affixed in a suitable alignment along the gauge mounting structure surface to measure twisting or torque deflections of the effector bar with respect to the longitudinal dimension of the effector bar. These deflections are translated from the effector bar to the gauge mounting structure (via the strain transfer materials described above) for measurement by the sensors.

The sensors are connected to a control circuit 200 (FIG. 3) within controller 120 via appropriate wiring 126, 128, where the controller provides appropriate information to gaming system 400 (FIG. 4). The information received by the gaming system is processed to display a video game scenario on the gaming system. The scenario is updated in accordance with strain forces applied to the effector bar by a user. The controller may further be configured to control the level of exertion required by a user in order to achieve a particular response in the video game scenario. Resistance levels may be input to an exercise processor 154 (FIG. 3) by the user via input devices 156 (e.g., a keypad). Alternatively, or in combination with user input, the resistance levels may be controlled by the exercise processor based upon conditions within the video game scenario, such as changing wind conditions, changing grade of the terrain (e.g., going uphill), etc.

A display 124 (FIG. 1) is further disposed on the controller upper portion and may display various information to the user (e.g., the degree of force applied to a particular effector bar at any given time, the amount of work performed by the user during a particular exercise session, resistance levels, time or elapsed time, force applied to the various axes (X and Y axes), instantaneous force applied, total weight lifted, calories burned (e.g., based on the amount of work performed and user weight), resistance level setting, degree of effector bar movement and/or any other exercise or other related information). The display is preferably implemented by a Liquid Crystal Display (LCD), but may be any type of display (e.g., LED, etc.).

An exemplary control circuit for exercise device 10 is illustrated in FIG. 3. Specifically, control circuitry 200 includes sensors 150, 160 and corresponding amplifiers 152, 162, exercise processor 154, a switching device or matrix 158 and a signal processor 164. A conventional power supply (not shown) provides appropriate power signals to each of the circuit components. The circuit may be powered by a battery and/or any other suitable power source (e.g., the gaming system). A power switch (not shown) may further be included to activate the circuit components. Further, the circuit may include trim potentiometers 153 to adjust the centering and range of strain gauge sensors 150, 160.

Sensors 150, 160 are each connected to a respective amplifier 152, 162. The electrical resistance of sensors 150, 160 vary in response to compression and stretching of the effector bar. Amplifiers 152, 162 basically amplify the sensor signals (e.g., in a range compatible with the type of controller employed). The amplified voltage value is sent by each amplifier to exercise processor 154 and switching device 158. Exercise processor 154 may be implemented by any conventional or other processor and typically includes circuitry and/or converts the analog signals from the amplifiers to digital values for processing. Basically, the amplified sensor value represents the force applied by the user, where values toward the range maximum indicate greater applied force. The amplified analog value is digitized or quantized within a range in accordance with the quantity of bits within the converted digital value (e.g., −127 to +127 for eight bits signed, −32,767 to +32,767 for sixteen bits signed, etc.) to indicate the magnitude and/or direction of the applied force. Thus, amplified voltage values toward the range maximum produce digital values toward the maximum values of the quantization ranges.

The exercise processor receives resistance level and reset controls from the user via input devices 156 as described above, and controls amplifier gain parameters to adjust system resistance in accordance with the user specified controls. In particular, the exercise processor adjusts the gain control of the amplifiers in order to facilitate a resistance level in accordance with user input and/or the video game scenario. The gain control parameter basically controls the amount of gain applied by the amplifier to an amplifier input (or sensor measurement). Since greater amplified values correspond to a greater force, increasing the amplifier gain enables a user to exert less force to achieve a particular amplified force value, thereby effectively lowering the resistance of the system for the user. Conversely, reducing the amplifier gain requires a user to exert greater force to achieve the particular amplified force value, thereby increasing the resistance of the system for the user. The exercise processor further adjusts an amplifier Auto Null parameter to zero or tare the strain gauge sensors.

The exercise processor is further connected to display 124 to facilitate display of certain exercise or other related information as described above. The exercise processor receives the amplified sensor values and determines various information for display to a user (e.g., the degree of force applied to a particular effector bar at any given time, the amount of work performed by the user during a particular exercise session, resistance levels, time or elapsed time, force applied to the various axes (X and Y axes), instantaneous force applied, total weight lifted, calories burned (e.g., based on the amount of work performed and user weight), resistance level setting, degree of effector bar movement and/or any other exercise or other related information). In addition, the exercise processor resets various parameters (e.g., resistance, time, work, etc.) in accordance with reset controls received from input devices 156 (e.g., to provide a new session for logging information).

Switching device 158 receives the signals from amplifiers 152, 162 and is coupled to input devices or switch controls 157, joystick 121 and signal processor 164. Switching device 158 enables a user to selectively configure controller 120 for game functions as described below. By way of example only, effector bar 110 (FIG. 1) serves as a right controller joystick, while joystick 121 serves as the left controller joystick, where the functions of the joysticks with respect to a game may be selectively assigned by a user as described below. However, the effector bar may serve as any joystick or other input device.

The switching device receives information from amplifiers 152, 162 and is coupled to the inputs of signal processor 164. The switching device basically enables information for controller input devices to be selectively placed on the signal processor inputs corresponding to the desired game functions. In particular, switching device 158 is utilized to selectively exchange game functions between joystick 121 and the effector bar. The switching device includes double pole double throw switches 166, 168 that are respectively associated with X and Y motion axes. By way of example only, switch 166 is associated with an X motion axis (e.g., lateral or right/left forces applied to the effector bar or joystick), while switch 168 is associated with the Y motion axis (e.g., forward/backward forces applied to the effector bar or joystick).

A series of switching device outputs 170, 172 and 174, 176 (e.g., labeled RX, LX, RY and LY, respectively, as viewed in FIG. 3) are respectively associated with switches 166, 168 and are each coupled to specific inputs of signal processor 164. The signal processor inputs are typically mapped to game functions in accordance with the game software executed by game processor 414. Switches 166, 168 basically couple the signals from the desired devices (e.g., effector bar or joystick) to the signal processor inputs corresponding to the desired game functions in accordance with controls from a user entered via input devices or switch controls 157. In particular, switch 166 includes for each corresponding throw switch 180, 182 switch contacts that are coupled to sensor 150 and to a signal source 125 of joystick 121 measuring X axis motion. Throw switch 180 is associated with output 170, while throw switch 182 is associated with output 172. These outputs effectively represent the X axis (e.g., lateral or left/right) motion of controller joysticks. The throw switches are configured in a manner to enable the signal from sensor 150 to be placed on one output and the joystick signal to be placed on the other output in accordance with the user control signals, thereby enabling the user to map the joystick or effector bar to a desired game function.

Similarly, switch 168 includes for each corresponding throw switch 184, 186 switch contacts that are coupled to sensor 160 and to a signal source 125 of joystick 121 measuring Y axis motion. Throw switch 184 is associated with output 174, while throw switch 186 is associated with output 176. These outputs effectively represent the Y axis (e.g., forward/backward) motion of controller joysticks. The throw switches are configured in a manner to enable the signal from sensor 160 to be placed on one output and the joystick signal to be placed on the other output in accordance with the user control signals, thereby enabling the user to map the joystick or effector bar to a desired game function. Thus, the functions of joysticks within a game may be selectively assigned to be performed by joystick 121 and/or the effector bar.

Applications of higher complexity with respect to blending or assigning game functions may require additional selector switches and various combinations of selector switch settings. For example, the joystick or effector bar may individually perform the functions of two joysticks in accordance with the connections. Further, the exercise device may include various devices (e.g., foot pedals, stairs, ski type exercisers, treadmills, cycling, etc.) that provide isokinetic and/or isotonic exercise features in addition to the isometric exercise features provided by the effector bar as described above. These exercise devices may similarly be assigned to game functions by the user in substantially the same manner described above. In this case, the signal sources associated with these devices are coupled to switching device 158 to direct the signals associated with the exercise devices to the appropriate inputs of signal processor 164. Switching device 158 may alternatively be implemented by any quantity of any conventional or other devices capable of switching signals (e.g., switches, multiplexers, cross-bar switch, analog switches, digital switches, routers, logic, gate arrays, logic arrays, etc.) to accomplish the function assignments for the exercise device.

The signals from the switching device outputs are transmitted to a respective predetermined memory location within signal processor 164. The signal processor may be implemented by any conventional or other processor and typically includes circuitry and/or converts the analog signals from the switching device to digital values for processing in substantially the same manner described above. The signal processor samples the memory locations at predetermined time intervals (e.g., preferably on the order of ten milliseconds or less) to continuously process and send information to the game processor to update and/or respond to an executing gaming application.

Basically, the signal processor processes and arranges the switching device signals into suitable data packets for transmission to game processor 414 of gaming system 400. The signal processor may process raw digital values in any fashion to account for various calibrations or to properly adjust the values within quantization ranges. The data packets are in a format resembling data input from a standard peripheral device (e.g., game controller, etc.). For example, the processor may construct a data packet that includes the status of all controller input devices (e.g., joystick 121, buttons 123, etc.) and the values of each sensor. By way of example only, the data packet may include header information, X-axis information indicating a corresponding sensor force and joystick measurement along this axis, Y-axis information indicating a corresponding sensor force and joystick measurement along this axis, rudder or steering information, throttle or rate information and additional information relating to the status of input devices (e.g., buttons, etc.). Additional packet locations may be associated with data received from controller or other input and/or exercise devices coupled to the signal processor, where the input devices may represent additional operational criteria for the scenario (e.g., the firing of a weapon in the scenario when the user presses an input button, throttle, etc.). The game processor processes the information or data packets in substantially the same manner as that for information received from a conventional peripheral (e.g., game controller, etc.) to update and/or respond to an executing gaming application (e.g., game, etc.) displayed on monitor or display 416 of the gaming system.

Exercise device 10 may serve as a game controller that is operable with a wide variety of video gaming or other systems including PS2, XBOX and GAMECUBE systems, and various personal or other computers (e.g., personal computers with Microsoft WINDOWS and Apple Mac OS X operating systems). Exercise device 10 includes a cable system that facilitates connection and communication between controller 120 and multiple (e.g., two or more) video gaming systems. Referring to FIG. 4, a cable system 220 is connected to and extends from a rear surface of controller 120 (e.g., a controller surface that opposes the controller surface including joystick 121, buttons 123 and display 124) and at a location above controller handle 122. Cable system 220 is substantially similar to the cable system described in aforementioned U.S. patent application Ser. No. 11/097,370 and includes a flexible and hollow body 224 that extends into controller 120 via an access panel or door (not shown) to receive and retain wiring that is connected with signal processor 164 (FIG. 3) within the controller. Alternatively, the cable may connect with the controller at any other suitable location and/or in any other suitable manner. A number of separately and independently extending wires are sheathed within and extend the length of cable body 224. The wires are configured for providing an electrical contact or link between signal processor 164 of controller 120 and a specific video gaming system as described below.

Cable body 224 extends a selected distance from controller 120 and connects with a generally rectangular housing 226. A number of flexible and hollow cables 227, 230, 240, 250 extend from housing 226. The wiring within cable body 224 extends within housing 226 for transfer of signals to wiring sets directed into and through a respective one of the output cables 227, 230, 240, 250. Thus, housing 226 serves as a junction location for the transfer of signals between wiring within cable body 224 and respective wiring sets of the output cables, where each output cable includes a wiring set that is configured for connection to a game controller port of a corresponding video gaming system.

Each output cable 227, 230, 240, 250 terminates in a respective connection plug 228, 231, 241, 251. The connection plugs are each configured to connect with a corresponding game controller port of a respective video gaming system. The connection plugs connect with the game controller ports in a male-female mating relationship. In particular, each connection plug includes a male component with associated metal pins and/or other contacting structure that is configured for insertion into a corresponding female component of a respective controller port. These connections establish an electrical contact between the wiring set associated with the connection plug and corresponding wiring that connects in a suitable manner with the game processor of the video gaming system. By way of example only, connection plug 251 is configured to connect with a game controller port of a GAMECUBE system, connection plug 241 is configured to connect with a game controller port of an XBOX system, connection plug 231 is configured to connect with a game controller port of a PS2 system, and connection plug 228 is configured to connect with a universal serial bus (USB) port of any suitable gaming system or personal or other computer (e.g., to facilitate control of Microsoft WINDOWS or Apple Mac OS X based gaming or other applications). However, the cable system is not limited to this exemplary configuration, but rather can include any suitable number (e.g., two or more) of connection plugs of any suitable types and configurations to facilitate connections with any types of video gaming or other systems.

Cable system 220 is of a suitable length (e.g., eight feet or greater) to facilitate a relatively easy connection between exercise device 10 and video gaming system 400. In situations where the exercise system is located a considerable distance (e.g., greater than eight feet) from a video gaming system, the exercise device may employ an extension cable device 300. Cable device 300 is substantially similar to the cable device disclosed in aforementioned U.S. patent application Ser. No. 11/097,370, and is coupled to cable system 220 to connect the cable system with the video gaming system. In particular, extension cable device 300 includes a flexible and hollow cable 302 that extends a suitable length (e.g., about 8 feet or greater) and includes a first housing 316 at a first end of the cable and a second housing 328 at a second end of the cable. Cable 302 is substantially similar in configuration and design as cable 224 of cable system 220, where the same or substantially similar wiring extends through the cable. Further, cable 302 can include one or more wires that transfer common or shared signals for two or more wiring sets.

Each housing 316, 328 is substantially similar in configuration and design as housing 226 of cable system 220. Each housing serves as a junction location to transfer signals between the wiring within cable 302 and each of a plurality of wiring sets in a similar manner as described above for housing 226. In particular, a number of flexible and hollow cables 304, 306, 308, 310 extend from housing 316. The housing is disposed between cable 302 and these cables to facilitate a connection. Each cable 304, 306, 308, 310 couples a respective wiring set therein to housing 316 and terminates at a respective connection plug 305, 307, 309, 311. The housing transfers signals between the wiring sets and the appropriate wiring in cable 302, where one or more of the wires of cable 302 may convey signals common to the gaming systems to reduce the quantity of wires employed by the cable.

Connection plugs 305, 307, 309, 311 are complimentary with and configured for connection to corresponding connection plugs 227, 231, 241, 251 of cable system 220. In addition, the wiring sets disposed within the connection plugs of extension cable device 300 include the same or substantially similar wiring as the wiring sets disposed within the corresponding connection plugs of cable system 220. The connection plugs of the cable system and extension device connect with each other in a male-female mating relationship, where a male component of each connection plug of cable system 220 is inserted into a female component of a corresponding connection plug of extension cable device 300. This achieves an electrical contact between metal elements (e.g., pins and corresponding receiving receptacles and/or other metal complimentary contacting structures) of the plugs that further facilitates an electrical connection between the corresponding pairs of wiring sets extending within the cable system and the extension cable device. However, any other suitable connection between the connection plugs can be provided to facilitate electrical contact between corresponding pairs of wiring sets.

A number of flexible and hollow cables 320, 322, 324, 326 extend from housing 328. The housing is disposed between cable 302 and these cables to facilitate a connection. Each cable 320, 322, 324, 326 couples a respective wiring set therein to housing 328 and terminates at a respective connection plug 321, 323, 325, 327. The housing transfers signals between the wiring sets and the appropriate wiring in cable 302, where one or more of the wires of cable 302 may convey signals common to the gaming systems to reduce the quantity of wires employed by cable 302 as described above. Connection plugs 321, 323, 325, 327 are identical in configuration and design as corresponding connection plugs 227, 231, 241, 251 of cable system 220. Thus, each connection plug 321, 323, 325, 327 of the extension cable device includes a male component with associated metal pins and/or other metal contacting structure that is configured for insertion into a corresponding female component of a respective controller port to establish an electrical contact between the wiring set associated with the connection plug and corresponding wiring of the video gaming system to which the connection plug is connected.

The sets of wiring that are directed to each connection plug 321, 323, 325, 327 of the extension cable device are further the same or substantially similar as the wiring sets of a corresponding connection plugs of cable system 220. Thus, the mapping of wiring sets through cable system 220 to the various connection plugs is maintained by extension cable device 300 so as to facilitate an extension of the various wiring sets a suitable distance for providing communication between controller 120 and video gaming system 400. In addition, it is noted that extension cable device 300 can also be utilized with any video gaming system and corresponding game controller that include connecting components corresponding with any of the connection plug sets provided on the extension cable device. This enables the extension cable device to serve as a universal extension cable for a variety of different connection plug/port designs that exist for different video gaming systems and game controllers.

Control circuitry 200 of the exercise device controller is configured for effective communication and operability as a game controller with each of the video gaming systems associated with the wiring sets and cable connectors of the cable system. In particular, when cable system 220 (optionally including extension cable device 300) is connected with a video gaming system in the manner described above, controller signal processor 164 identifies the specific video gaming system with which control unit 120 is connected upon receiving one or more initial electrical signals (e.g., one or more "wake-up" signals) from the video gaming system. When the specific video gaming system is identified, the controller signal processor processes and arranges signals into suitable data packets for transmission to and recognition by the video gaming system during a gaming application as described above.

Operation of exercise device 10 is described with reference to FIG. 4. Initially, a user couples the exercise device to video gaming system 400 utilizing the appropriate connection plug or plugs of cable system 220 and/or extension cable device 300 (e.g., the particular connection plug or plugs compatible with the gaming system). Based upon the video gaming system utilized and/or the particular gaming application that is to be executed, the user may selectively assign game functions to the joystick, the effector bar and/or other input and/or exercise devices as described above. The user may adjust the exercise device (e.g., controller height, etc.) to accommodate the user physical characteristics. The exercise device is placed on an appropriate surface (e.g., floor, chair, couch, bed, etc.), where the user is typically seated on exercise device 10 with user legs supported by support platforms 30a, 30b (e.g., with the legs extending over respective support platforms 30a, 30b) and effector bar 110 disposed between the user legs. The user weight and/or body basically stabilizes the effector bar for manipulation. In other words, the user body or weight provides sufficient resistive or stabilizing forces for the effector bar to enable manipulation of that bar by the user.

During an initial set-up sequence (e.g., when the video gaming system is powered on), signal processor 164 (FIG. 3) of controller 120 receives one or more initial signals from video gaming system 400. The signal processor identifies the specific video gaming system based on those initial signals and arranges data in suitable data packets for recognition by the identified system. A game is selected and executed on the gaming system, and the user engages in an exercise to interact with the game. The user operates the exercise device with the user legs supported by support platforms 30a, 30b and the user hands placed on controller handle 122. The user grips the controller handle and applies a force to the controller to exert a strain on the effector bar. The user applies one or more forces to the controller and, hence, the effector bar with respect to at least one of the X and Y axes to produce a corresponding game movement (e.g., of a character or an object in the scenario displayed by the game processor). The user may further manipulate joystick 121, other controller input devices and/or other exercise devices for additional actions depending upon the particular game and user function assignments.

The signals from strain gauge sensors 150, 160 and controller input devices (e.g., joystick, buttons, etc.) are transmitted to the controller signal processor to generate data packets for transference to video gaming system 400. The gaming system processes the information or data packets in substantially the same manner as that for information received from a conventional peripheral (e.g., game controller, etc.) to update and/or respond to an executing gaming application. Thus, the force applied by the user to the effector bar results in a corresponding coordinate movement or action in the scenario displayed on the video gaming display in accordance with the function assigned to the bar by the user. In other words, user exercise serves to indicate desired user actions or movements to the gaming system to update movement or actions of characters or objects within the game in accordance with the function assigned to the bar. For example, when the user assigns the effector bar accelerator and steering functions, application of a forward force to the controller may serve as the accelerator, while lateral force applied to the controller may serve as the steering function.

As noted above, a single signal processor is implemented in the control circuit of the exercise device, where the signal processor is capable of communicating with a number of different video gaming systems in the manner described above. However, the present invention is not limited to the use of a single processor. Rather, the exercise device may include multiple processors (e.g., two or more), where each processor is configured to enable communication of signals between the exercise device and at least one corresponding video gaming system as disclosed in the aforementioned patent applications. In addition, the electrical connection and/or communication between the one or more signal processors of the exercise device are not limited to the cable system and extension cable device described above. Rather, any suitable wired and/or wireless communication links can be provided that facilitate communication between one or more processors of the exercise device of the present invention and two or more different video gaming systems as disclosed in the aforementioned patent applications.

Figure 5:
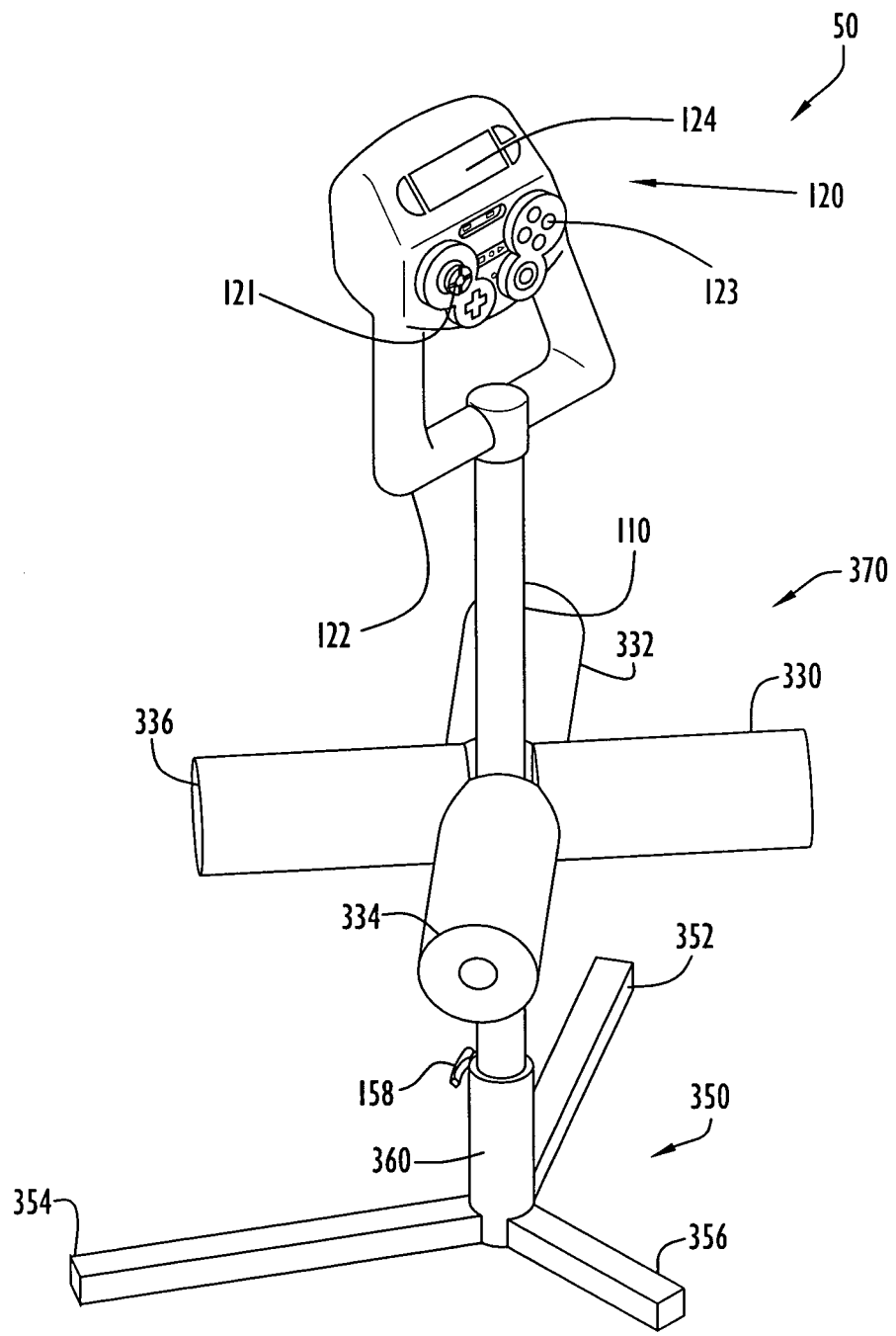
FIG. 5 is a view in perspective of an alternative embodiment of the exercise device of FIG. 1 according to the present invention.

An alternative embodiment of exercise device 10 is illustrated in FIG. 5. In particular, exercise device 50 includes a base 350, effector bar 110, a stability member 370 and controller 120. Base 350 includes a generally 'Y' type configuration with elongated branch members 352, 354 and an elongated stem member 356. The branch and stem members typically include a rectangular transverse cross section, where the branch members extend in opposing directions from the stem member distal end at an obtuse angle relative to the stem member, thereby forming the 'Y' type configuration.

A substantially cylindrical receptacle 360 is disposed at the junction of the stem and branch members. The receptacle extends upward from the base and includes dimensions sufficient to receive effector bar 110 for manipulation by a user as described below.

Effector bar 110 is substantially similar to the effector bar described above and is slidably received within receptacle 360 in a substantially upright position. A lock mechanism 158 may be employed to adjust the position of the effector bar within receptacle 360 in accordance with user characteristics (e.g., height, reach, etc.) as described above. Controller 120 is substantially similar to the controller described above and is attached or secured to the effector bar upper portion. The controller preferably includes buttons 123, joystick 121 and display 124 disposed on the controller upper portion as described above. The joystick and effector bar may be selectively configured or assigned to game functions as described above. The controller lower portion includes generally "U"-shaped handle or grip 122 for engagement by a user as described above.

Stability member 370 is disposed in sliding relation about effector bar 110 to enable a user to engage the stability member and stabilize the effector bar (e.g., enable a user to provide resistive or stabilizing forces for the effector bar) during user manipulation of that bar. The stability member includes a plurality of generally cylindrical support members 330, 332, 334 and 336 arranged in a cross type configuration (e.g., angularly displaced from each other by approximately ninety degrees) with an open central portion to receive effector bar 110. The stability member is in slidable relation with the effector bar and may be positioned along the effector bar at any desired location via any suitable conventional mechanisms (e.g., an O-ring, clamps, etc.). Support members 330, 332 are separated by a sufficient distance (e.g., angularly displaced by approximately ninety degrees) to enable a user leg or other body portion to be disposed between those members. Similarly, support members 334, 336 are separated by a sufficient distance (e.g., angularly displaced by approximately ninety degrees) to enable a user leg or other body portion to be disposed between those members. In addition, user feet may be placed on branch members 352, 354, where the user legs and feet engage the stability member and/or base to stabilize the effector bar (e.g., enable a user to provide resistive or stabilizing forces for the effector bar) for user manipulation of that bar. The support members are preferably padded for user comfort.

Effector bar 110 typically includes at least one sensor to measure at least one type of strain applied by the user to that bar as described above. The sensors may be arranged as described above and measure the amount of a strain deformation applied to the bar as a result of the user applying pushing, pulling or lateral forces to the controller handle. The sensors are connected to control circuit 200 (FIG. 3) within controller 120 via appropriate wiring, where the controller provides appropriate information to gaming system 400 (FIG. 4). Strain gauge measurements are processed to display a video game scenario on the gaming system. The scenario is updated in accordance with strain forces applied to the effector bar by a user as described above.

Figure 6:
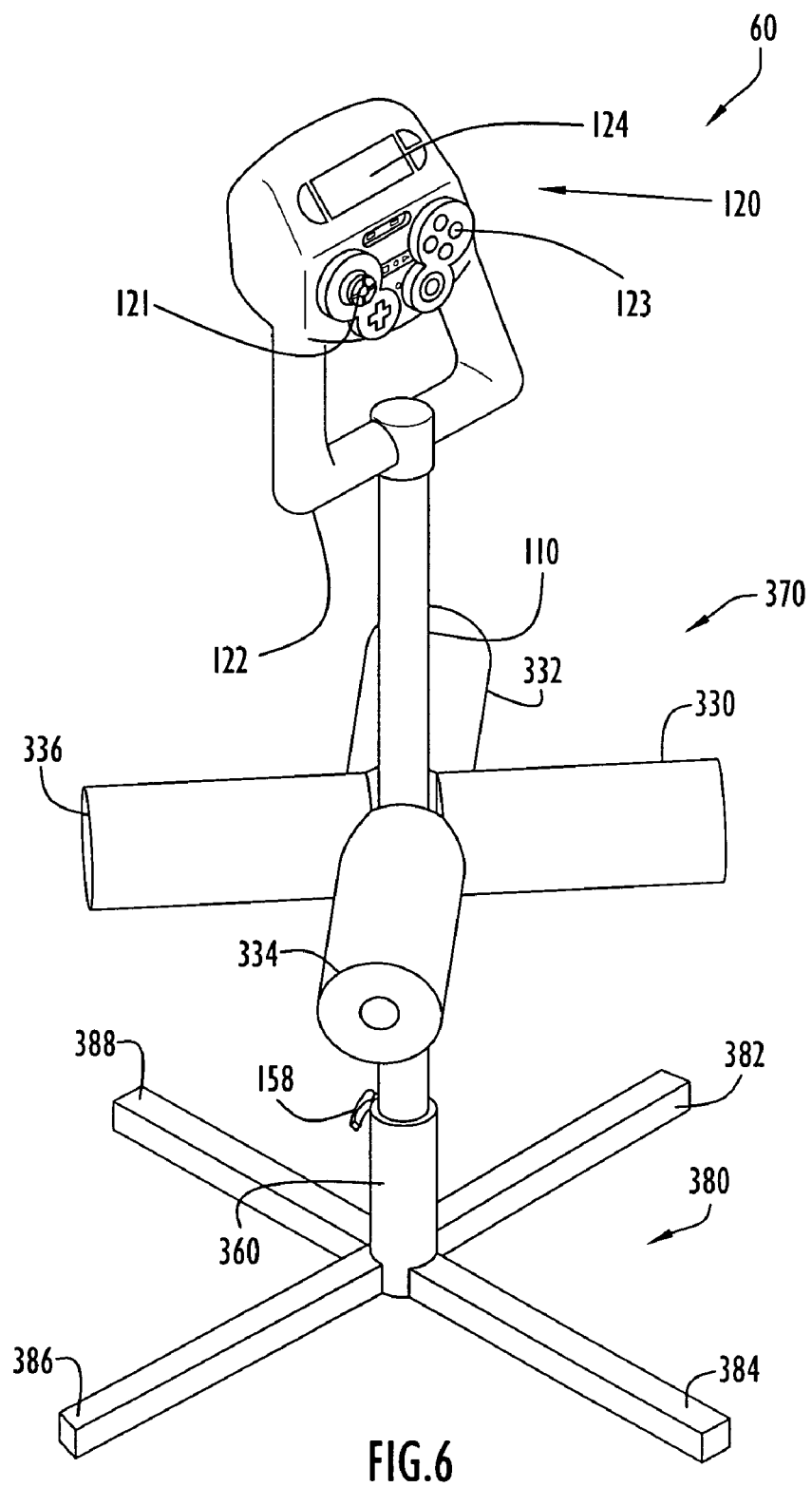
FIG. 6 is a view in perspective of the exercise device of FIG. 5 with an alternative base configuration according to the present invention.

Alternatively, exercise device 50 may include a base with a cross or plus type configuration as illustrated in FIG. 6. In particular, exercise device 60 is substantially similar to exercise device 50 (FIG. 5) described above and includes a base 380 with a cross or plus type configuration. The base includes a plurality of generally rectangular base members 382, 384, 386 and 388 arranged in a cross type configuration (e.g., angularly displaced from each other by approximately ninety degrees) with an open central portion to receive receptacle 360. The receptacle extends upward from the base and includes dimensions sufficient to receive effector bar 110 (with stability member 370 and controller 120) for manipulation by a user as described above. In addition, user feet may be placed on base members 382, 384, 386 and/or 388, where the user legs and feet engage the stability member and/or base to stabilize the effector bar (e.g., enable a user to provide resistive or stabilizing forces for the effector bar) for user manipulation of that bar. Base 380 provides enhanced stability of exercise device 60 for manipulation of effector bar 110.

Operation of exercise devices 50, 60 is described with reference to FIGS. 4-6. Initially, operation of these exercise devices is substantially similar to the manner of operation of exercise device 10 described above. In particular, a user couples exercise device 50, 60 to video gaming system 400 utilizing the appropriate connection plug or plugs of cable system 220 and/or extension cable device 300 (e.g., the particular connection plug or plugs compatible with the gaming system) in substantially the same manner described above for exercise device 10. Based upon the video gaming system utilized and/or the particular gaming application that is to be executed, the user may selectively assign game functions to the joystick, the effector bar and/or other input and/or exercise devices as described above. The user may adjust the exercise device (e.g., controller height, stability member height, etc.) to accommodate the user physical characteristics. The user is typically seated (e.g., on the floor or couch, in a chair, etc.) with user legs engaging the support members (e.g., with the legs extending over respective support members 330, 334, and downward toward the base between support member pairs 330, 332 and 334, 336) and/or base as described above to stabilize the effector bar (e.g., enable a user to provide resistive or stabilizing forces for the effector bar). The user may alternatively engage the stability member and/or base with any body portions in any suitable fashion to stabilize the effector bar.

During an initial set-up sequence (e.g., when the video gaming system is powered on), signal processor 164 (FIG. 3) of controller 120 receives one or more initial signals from video gaming system 400. The signal processor identifies the specific video gaming system based on those initial signals and arranges data in suitable data packets for recognition by the identified system as described above. A game is selected and executed on the gaming system, and the user engages in an exercise to interact with the game. The user operates the exercise device with the user legs engaging the stability member and/or base and the user hands placed on controller handle 122. The user grips the controller handle and applies a force to the controller to exert a strain on the effector bar. The user applies one or more forces to the controller and, hence, the effector bar with respect to at least one of the X and Y axes to produce a corresponding game movement (e.g., of a character or an object in the scenario displayed by the game processor). The user may further manipulate joystick 121, other controller input devices and/or other exercise devices for additional actions depending upon the particular game and user function assignments.

The signals from the strain gauge sensors and input devices (e.g., joystick, buttons, etc.) are transmitted to the controller signal processor to generate data packets for transference to video gaming system 400. The gaming system processes the information or data packets in substantially the same manner as that for information received from a conventional peripheral (e.g., game controller, etc.) to update and/or respond to an executing gaming application as described above.

Figure 7:
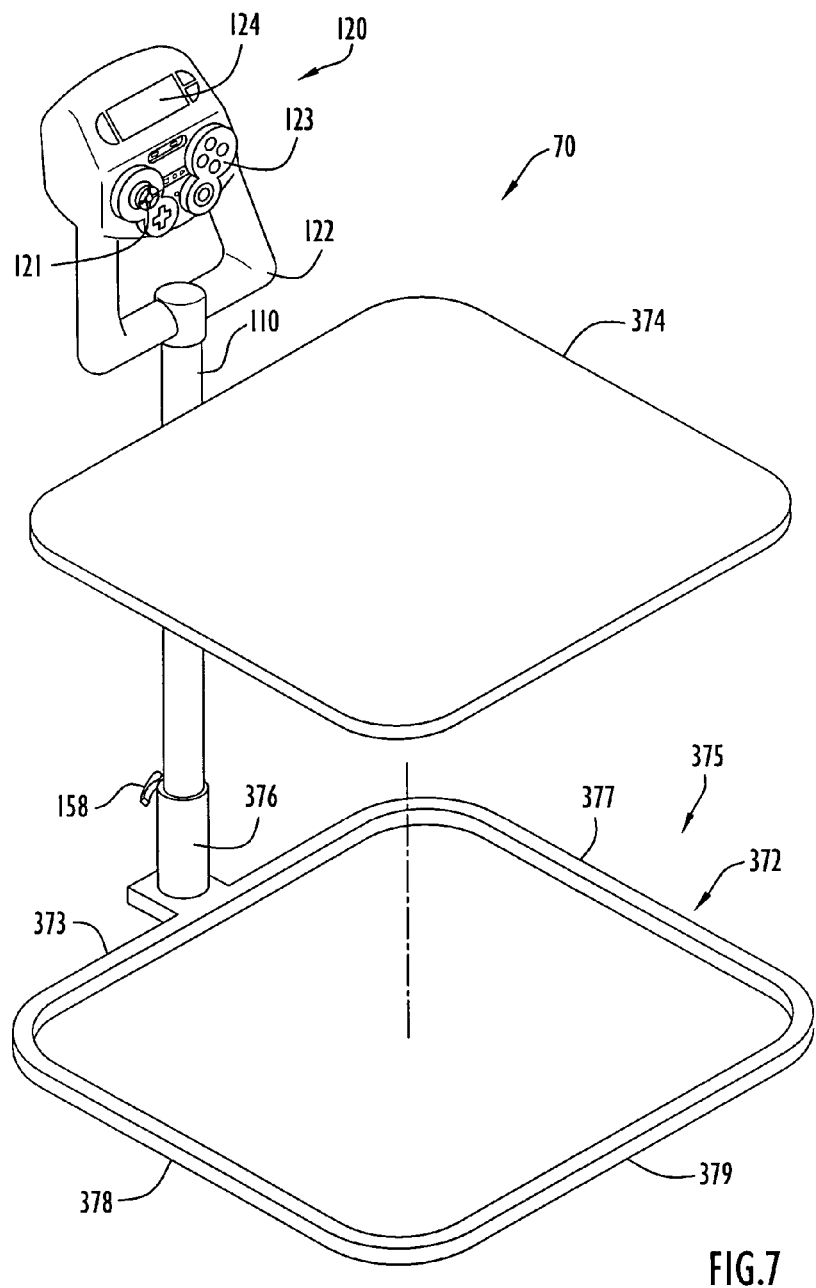
FIG. 7 is a view in perspective of another embodiment of the exercise device of FIG. 1 according to the present invention.

Another alternative embodiment of exercise device 10 is illustrated in FIG. 7. In particular, device 70 includes a base platform 375, effector bar 110 and controller 120. Base platform 375 includes a frame 372 and a plate 374. Frame 372 is substantially rectangular and includes front and rear bars 373, 379 and side bars 377, 378 that are collectively configured to form the frame rectangular configuration. A substantially cylindrical receptacle 376 is attached to front bar 373 of frame 372 and extends upward therefrom. The receptacle includes dimensions suitable to receive effector bar 110 therein. The frame bars define an area within base platform 375 to receive plate 374 therein. The plate includes a shape and dimensions sufficient to occupy and fit within that area. The plate is preferably constructed of a plastic material (e.g., ABS, PVC, etc.), but may be constructed of any suitable materials (e.g., wood, metal, plastic, fiberglass, etc.). The base platform and plate may be of any shape or size and include any suitable dimensions.

Effector bar 110 is substantially similar to the effector bar described above and is slidably received within receptacle 376 in a substantially upright position. A lock mechanism 158 may be employed to adjust the position of the effector bar within receptacle 376 in accordance with user characteristics (e.g., height, reach, etc.) as described above. Controller 120 is substantially similar to the controller described above and is attached or secured to the effector bar upper portion. The controller preferably includes buttons 123, joystick 121 and display 124 disposed on the controller upper portion as described above. The joystick and effector bar may be selectively configured or assigned to game functions as described above. The controller lower portion includes generally "U"-shaped handle or grip 122 for engagement by a user as described above.

Effector bar 110 typically includes at least one sensor to measure at least one type of strain applied by the user to that bar as described above. The sensors may be arranged in the manner described above and measure the amount of a strain deformation applied to the bar as a result of the user applying pushing, pulling or lateral forces to the controller handle. The sensors are connected to control circuit 200 (FIG. 3) within controller 120 via appropriate wiring, where the controller provides appropriate information to gaming system 400 (FIG. 4). Strain gauge measurements are processed to display a video game scenario on the gaming system. The scenario is updated in accordance with strain forces applied to the effector bar by a user as described above.

Operation of exercise device 70 is described with reference to FIGS. 4 and 7. Initially, operation of exercise device 70 is substantially similar to the manner of operation of the exercise devices described above. In particular, a user couples exercise device 70 to video gaming system 400 utilizing the appropriate connection plug or plugs of cable system 220 and/or extension cable device 300 (e.g., the particular connection plug or plugs compatible with the gaming system) in substantially the same manner described above for exercise devices 10, 50 and 60. Based upon the video gaming system utilized and/or the particular gaming application that is to be executed, the user may selectively assign game functions to the joystick, the effector bar and/or other input and/or exercise devices as described above. The user may adjust the exercise device (e.g., controller height, etc.) to accommodate the user physical characteristics. The exercise device is placed on an appropriate surface (e.g., floor, chair, couch, bed, etc.), where the user is typically seated on exercise device 70 with user legs supported by base platform 375 (e.g., with the legs extending over frame 372 and plate 374) and effector bar 110 disposed between the user legs. The user weight and/or body basically stabilizes the effector bar (e.g., enables a user to provide resistive or stabilizing forces for the effector bar).

During an initial set-up sequence (e.g., when the video gaming system is powered on), signal processor 164 (FIG. 3) of controller 120 receives one or more initial signals from video gaming system 400. The signal processor identifies the specific video gaming system based on those initial signals and arranges data in suitable data packets for recognition by the identified system as described above. A game is selected and executed on the gaming system, and the user engages in an exercise to interact with the game. The user operates the exercise device with the user legs supported by base platform 375 and the user hands placed on controller handle 122. The user grips the controller handle and applies a force to the controller to exert a strain on the effector bar. The user applies one or more forces to the controller and, hence, the effector bar with respect to at least one of the X and Y axes to produce a corresponding game movement (e.g., of a character or an object in the scenario displayed by the game processor). The user may further manipulate joystick 121, other controller input devices and/or other exercise devices for additional actions depending upon the particular game and user function assignments.

The signals from the strain gauge sensors and input devices (e.g., joystick, buttons, etc.) are transmitted to the controller signal processor to generate data packets for transference to video gaming system 400. The gaming system processes the information or data packets in substantially the same manner as that for information received from a conventional peripheral (e.g., game controller, etc.) to update and/or respond to an executing gaming application as described above.

It will be appreciated that the embodiments described above and illustrated in the drawings represent only a few of the many ways of implementing an isometric exercise system and method of facilitating user exercise during video game play.

Exercise device 10 and the corresponding components (e.g., effector bar, base, support platforms, controller, etc.) may be of any size or shape, may be arranged in any fashion and may be constructed of any suitable materials. The base may be of any size or shape, and include any quantity of channels of any size or shape defined in the base at any suitable locations and extending in any directions (e.g., transversely, longitudinally, at any desired angles, partially or entirely through the base, etc.). The openings may be of any quantity, size or shape and may be defined in the base at any suitable locations. The recesses may be of any quantity, size or shape and may be defined in the base at any suitable locations. The recesses and openings may be threaded in any fashion or combination. Alternatively, the openings, recesses and channels may be configured in any conventional or other manner to engage the bolt or other securing mechanism to secure the support platforms to the base. The bolt may be of any quantity, size or shape and may be implemented by any securing mechanism (e.g., bolt, screw, pin, clamp, etc.). The receptacle may be of any quantity, shape or size and may be disposed at any suitable location to receive the effector bar. The locking mechanism may include any type of locking device (e.g., friction device, clamp, peg and hole arrangement, etc.) to releasably maintain an exercise device component in a desired position or orientation to accommodate a user.

The support platforms may be of any quantity, shape, size or suitable materials with the same or different configuration. The support platforms may be permanently or removably secured to the base at any suitable locations, and may support any desired user body portions (e.g., legs, arms, torso, etc.), where the user may utilize the device in any suitable position (e.g., sitting down, standing, lying down, etc.). The frame member may be of any shape or size and include any quantity of arms and/or bars (e.g., support, frame, etc.) of any shape or size and configured in any manner. The arms, frame bar and support bar may be of any quantity, shape or size and configured in any manner (e.g., extend in parallel, at any angle, etc.)). The projections may be of any quantity, shape or size and include any configuration to enable mating with a corresponding support platform (e.g., tapered lower or upper sections, complementary configurations (e.g., hook and opening, clasp, etc.), etc.). The projection openings may be of any quantity, shape or size, may be defined at any suitable locations and may include any configuration to engage a securing mechanism (e.g., threads, etc.). The plate may be of any quantity, shape or size, may be constructed of any suitable materials and may be disposed within the support platform at any desired location or in any orientation.

Exercise device 50 and the corresponding components (e.g., effector bar, base, stability member, controller, etc.) may be of any size or shape, may be arranged in any fashion and may be constructed of any suitable materials. The branch and stem members may be of any quantity, shape or size, may be constructed of any suitable materials and may be arranged in any fashion (e.g., 'T', 'X' or 'Y' configuration, cross or plus configuration, star configuration, any angular offset, etc.). The support members may be of any quantity, shape or size, may be constructed of any suitable materials and may be arranged in any fashion (e.g., 'T', 'X' or 'Y' configuration, cross or plus configuration, star configuration, any angular offset, etc.). The support members may include any desired foam or padding for user comfort. The stability member may be adjustable relative to the effector bar via any conventional or other techniques (e.g., friction device, clamp, peg and hole arrangement, etc.) to accommodate user characteristics. The stability member and base may accommodate any desired user body portions (e.g., legs, arms, torso, etc.), where the user may utilize the device in any suitable position (e.g., sitting down, standing, lying down, etc.). The receptacle may be of any quantity, shape or size and may be disposed at any suitable location to receive the effector bar. The locking mechanism may include any type of locking device (e.g., friction device, clamp, peg and hole arrangement, etc.) to releasably maintain an exercise device component in a desired position or orientation to accommodate a user.

Exercise device 60 and the corresponding components (e.g., effector bar, base, stability member, controller, etc.) may be of any size or shape, may be arranged in any fashion and may be constructed of any suitable materials. The base members may be of any quantity, shape or size, may be constructed of any suitable materials and may be arranged in any fashion (e.g., 'T', 'X' or 'Y' configuration, cross or plus configuration, star configuration, any angular offset, etc.). The support members may be of any quantity, shape or size, may be constructed of any suitable materials and may be arranged in any fashion (e.g., 'T', 'X' or 'Y' configuration, cross or plus configuration, star configuration, any angular offset, etc.). The support members may include any desired foam or padding for user comfort. The stability member may be adjustable relative to the effector bar via any conventional or other techniques (e.g., friction device, clamp, peg and hole arrangement, etc.) to accommodate user characteristics. The stability member and base may accommodate any desired user body portions (e.g., legs, arms, torso, etc.), where the user may utilize the device in any suitable position (e.g., sitting down, standing, lying down, etc.). The receptacle may be of any quantity, shape or size and may be disposed at any suitable location to receive the effector bar. The locking mechanism may include any type of locking device (e.g., friction device, clamp, peg and hole arrangement, etc.) to releasably maintain an exercise device component in a desired position or orientation to accommodate a user.

Exercise device 70 and the corresponding components (e.g., effector bar, base platform, controller, etc.) may be of any size or shape, may be arranged in any fashion and may be constructed of any suitable materials. The base platform may support any desired user body portions (e.g., legs, arms, torso, etc.), where the user may utilize the device in any suitable position (e.g., sitting down, standing, lying down, etc.). The frame may be of any quantity, shape or size, and may be constructed of any suitable materials. The frame may include any quantity of bars of any shape, size or suitable materials, where the bars may be configured or arranged in any manner. The plate may be of any quantity, shape or size, may be constructed of any suitable materials and may be disposed within the frame at any desired location and in any orientation. The receptacle may be of any quantity, shape or size and may be disposed at any suitable location to receive the effector bar. The locking mechanism may include any type of locking device (e.g., friction device, clamp, peg and hole arrangement, etc.) to releasably maintain an exercise device component in a desired position or orientation to accommodate a user.

The effector bar for the exercise devices may be constructed of any suitable materials that preferably are subject to measurable deflection within an elastic limit of the materials when subjected to one or more straining or other forces by the user. The effector bar may have any suitable geometric configurations, and two or more effector bars may be combined in any suitable manner to yield a device that conforms to a desired design for a user for a particular application. The effector bar may be positioned at any desired orientation or angle (e.g., the receptacle may be angled, the effector bar may be disposed within the receptacle at an angle, the effector bar may be adjustable to any desired angle by a user, etc.). The exercise devices may further include various exercise mechanisms to control the video game and provide further exercise for a user (e.g., cycling, stair mechanism, etc.).

Any suitable number of any types of sensors (e.g., strain gauges, etc.) may be applied to an effector bar and/or gauge mounting structure to facilitate the measurement of any one or more types of strain or other forces applied by the user (e.g., bending forces, twisting forces, compression forces and/or tension forces). The exercise devices may be utilized on any suitable surface (e.g., floor, couch, bed, etc.) and may be adjustable in any fashion (e.g., any dimension, controller and/or stability member height, etc.) via any types of arrangements of components (e.g., telescoping arrangement, overlapping arrangement, extender components, etc.) to accommodate user physical characteristics.

The sensors may be constructed of any suitable materials, may be disposed at any locations on the effector bar and/or gauge mounting structure and may be of any suitable type (e.g., strain gauge, etc.). Further, the sensors may include any electrical, mechanical or chemical properties that vary in a measurable manner in response to applied force to measure force applied to an object. The sensors may include any desired arrangement. The exercise devices may include any suitable number of effector bars and gauge mounting structures secured within the effector bars. The gauge mounting structures may be constructed of any suitable materials that preferably permit their deformation within an elastic limit as a result of bending, twisting, compression and/or torque forces applied to the effector bar. Preferably, the gauge mounting structures are constructed of materials that are more compliant and have greater flexibility than the effector bars to which they are secured when each are subjected to the same amount and/or type of forces. The gauge mounting structures may have any suitable geometric configurations that preferably facilitate securing of one or more gauge mounting structures within an effector bar, and two or more effector bars may be combined in any suitable manner to yield a system frame that conforms to a desired design for a user for a particular application.

The gauge mounting structures may be hollow or solid. For example, in an embodiment where a gauge mounting structure is hollow, the strain gauge sensors may be secured at suitable locations to outer surface portions on the gauge mounting structure with associated wiring extending within the annular gap between the gauge mounting structure and the effector bar. Alternatively, the gauge mounting structures may be solid structures, where both the strain gauges and wiring are secured and/or extend from outer surface portions of the gauge mounting structures.

Strain transfer materials may be provided of any suitable types, sizes and configurations to facilitate transfer of applied forces from the effector bars to one or more gauge mounting structures disposed within the effector bars. The strain transfer materials can be formed of any suitable materials that effect a transfer of at least a portion of the applied forces from the effector bar to the gauge mounting structure. The strain transfer materials may be disposed at any one or more suitable locations within the effector bars to provide a connection at selected surface locations between the effector bars and the gauge mounting structures. Alternatively, gauge mounting structures may be designed to include one or more suitably sized and configured outer peripheral sections that frictionally engage with interior peripheral surface portions of the effector bars so as to facilitate one or more strain transfer contacting surfaces between the gauge mounting structures and the effector bars.

The controller for the exercise devices may be of any shape or size, may be constructed of any suitable materials, and may be of the type of any commercially available or other game controller (e.g., those for use with PS2, XBOX, GAMECUBE, etc.). The controller may include any quantity of any types of input devices (e.g., buttons, slides, joysticks, track type balls, etc.) disposed at any locations and arranged in any fashion. The controller may include any quantity of any types of signal source devices to generate signals in accordance with input device manipulation (e.g., variable resistors or potentiometers, switches, contacts, relays, sensors, strain gauges, etc.). The signal sources may correspond with any quantity of axes for an input device. Any controller input devices may be implemented as force sensing or isometric devices, while the controller input devices may be assigned to any suitable game functions. The controller may include any quantity or combination of force sensing input devices and motion input devices. The controller handle may be of any quantity, shape or size and may be disposed at any location to receive force applied by a user. Alternatively, the user may apply force directly to the effector bar.

The effector bar and/or other input devices may be assigned the gaming functions of any desired controller input devices. The switching matrix or device may be implemented by any quantity of any conventional or other devices capable of switching signals (e.g., switches, multiplexers, cross-bar switch, analog switches, digital switches, routers, logic, gate arrays, logic arrays, processor, etc.). The switch controls may include a control processor to control the switching device in accordance with the controls to achieve the desired function assignment. The switch controls may be implemented by any conventional or other control or input devices (e.g., processor, slides, switches, buttons, etc.) to provide control signals to the switching device or control processor. The switching device or switch controls may alternatively provide a user interface to enable the user to enter information to configure the controller in the desired manner. The interface may be in the form of screens on a controller display or controller lights or other indicators. Further, the interface may be shown on the gaming system display and implemented by the game processor of the gaming system. The control processor may be implemented by any conventional or other processor or circuitry (e.g., microprocessor, controller, etc.). The switching device may direct signals from any quantity of inputs to any quantity of outputs in accordance with user-specified or other controls and may map any controller input devices and/or exercise mechanisms to any suitable game functions. The switching device may be disposed internal or external of the controllers.

The gaming system may be implemented by any quantity of any personal or other type of computer or processing system (e.g., IBM-compatible, Apple, Macintosh, laptop, palm pilot, microprocessor, gaming consoles such as the XBOX system from Microsoft Corporation, the PLAY STATION 2 system from Sony Corporation, the GAMECUBE system from Nintendo of America, Inc., etc.). The gaming system may be a dedicated processor or a general purpose computer system (e.g., personal computer, etc.) with any commercially available operating system (e.g., Windows, OS/2, Unix, Linux, etc.) and/or commercially available and/or custom software (e.g., communications software, application software, etc.) and any types of input devices (e.g., keyboard, mouse, microphone, etc.). The gaming system may execute software from a recorded medium (e.g., hard disk, memory device, CD, DVD or other disks, etc.) or from a network or other connection (e.g., from the Internet or other network).

The controller may arrange data representing force measurements by sensors and other controller information into any suitable data packet format that is recognizable by the gaming system or host computer system receiving data packets from the controller. The data packets may be of any desired length, include any desired information and be arranged in any desired format. Any suitable number of any type of conventional or other displays may be connected to the controller or gaming system to provide any type of information relating to a particular computer session. A display may be located at any suitable location on or remote from the controller.

Each of the exercise devices may be adjustable in any fashion (e.g., any dimension, controller and/or support height, controller and/or support orientation or distance to the user, etc.) via any types of arrangements of components (e.g., telescoping arrangement, overlapping arrangement, extender components, etc.) to accommodate user physical characteristics. The locking mechanisms may include any type of locking device (e.g., friction device, clamp, peg and hole arrangement, etc.) to releasably maintain an exercise system component in a desired position or orientation to accommodate a user.

The processors (e.g., control, exercise, signal, game, switching devices, etc.) may be implemented by any quantity of any type of microprocessor, processing system or other circuitry, while the control circuitry may be disposed at any suitable locations on the devices, within the controller or, alternatively, remote from the devices. The control circuitry and/or signal processor may be connected to one or more game processors or host computer systems via any suitable peripheral, communications media or other port of those systems. The signal processors may further arrange digital data (e.g., force or other measurements by sensors, controller information, etc.) into any suitable data packet format that is recognizable by the game processor or host computer system receiving data packets from the signal processors. The data packets may be of any desired length, include any desired information and be arranged in any desired format.

The signal processor may sample the information at any desired sampling rate (e.g., seconds, milliseconds, microseconds, etc.), or receive measurement values or other information in response to interrupts. The analog values may be converted to a digital value having any desired quantity of bits or resolution. The processors (e.g., control, signal, exercise, etc.) may process raw digital values in any desired fashion to produce information for transference to the display, game processor or host computer system. This information is typically dependent upon a particular application. The correlation between the measured force or exercise motion and provided value for that force or motion may be determined in any desired fashion. By way of example, the amplified measurement range may be divided into units corresponding to the resolution of the digital value. For an eight bit unsigned digital value (e.g., where the value indicates the magnitude of force), each increment represents $1/256$ of the voltage range. With respect to a five volt range, each increment is $5/256$ of a volt, which is approximately 0.02 volts. Thus, for an amplified force measurement of three volts, the digital value may correspond to approximately 150 (e.g., 3.0/0.2).

Any suitable number of any types of conventional or other circuitry may be utilized to implement the control circuit, amplifiers, sensors, trim potentiometers, switching device and processors (e.g., exercise, control, signal, etc.). The amplifiers may produce an amplified value in any desired voltage range, while the A/D conversion may produce a digitized value having any desired resolution or quantity of bits (e.g., signed or unsigned). The control circuit may include any quantity of the above or other components arranged in any fashion. The resistance change of the sensors may be determined in any manner via any suitable conventional or other circuitry. The amplifiers and processors (e.g., exercise, signal, etc.) may be separate within a circuit or integrated as a single unit. Any suitable number of any type of conventional or other displays may be connected to the processors (e.g., exercise, signal, control, game, etc.), where the processors may provide any type of information relating to a particular computer interactive exercise session (e.g., results from isometric exercises including force and work, results from motion exercise including speed and distance traveled, calories burned, weight lifted, etc.). A display may be located at any suitable location on or remote from the exercise devices.

The control circuitry and/or signal processors of the game controllers may be connected to one or more game processors of video gaming or host computer systems via any suitable peripheral, communications media or other port of those systems. Any suitable number and types of wired and/or wireless devices may be provided to facilitate communications between game controllers and video gaming systems. For example, any suitable number of cables can be provided and configured for connection with each other, with each cable including one or more suitable wiring sets with one or more wires, to facilitate connection with two or more video gaming systems. The cable junctions of the cable system and extension cable device may transfer signals between the wires within the cable and wiring sets in any fashion (e.g., direct connection of wires, connection to a terminal, etc.). The wiring of the cable may be connected to any quantity of wiring sets, where the cable wiring may utilize one or more wires to transfer gaming signals common to any quantity of wiring set wires to reduce the quantity of wires employed in the cable. Alternatively, the cable may include a dedicated wire for each wiring set wire. Any suitable number and types of housings or other structures may be connected with one or more cables to facilitate transfer of signals between wiring extending within a cable and wiring sets for transfer into separate cables. Any suitable number and types of connectors (e.g., male and/or female connection plugs) may be provided to facilitate connection and a communication link between a game controller and one or more different video gaming systems. The cable system and extension cable device may include cables of any suitable lengths. The wake-up signal may include any signal or desired information to identify a gaming system (e.g., voltage or current level, gaming system identifier, etc.).

Any suitable number and types of wireless communication links (e.g., transmitters, receivers and/or transceivers) that send and/or receive any suitable types of signals (e.g., RF and/or IR) can be provided for connection with a game controller and/or one or more video gaming systems. One or more signal processors may be connected with one or more wireless communication links to facilitate communications between a game controller and one or more video gaming systems. In addition, one or more signal processors may be provided within a communication device (e.g., a transceiver), connection plugs and/or other connecting structure that connects with one or more video gaming systems, where the signal processors are configured to identify video gaming systems to which they are connected and convert data transmissions for recognition by a game controller and/or a video gaming system that are linked to each other.

Further, a universal adaptor may be provided that is generic and configured to connect with any selected types of game controllers and video gaming systems, where the universal adaptor includes one or more suitable signal processors to identify a specific video gaming system and to effectively convert data transmissions for recognition by each of the game controller and the specific video gaming system that is connected to the game controller via the universal adaptor. The universal adaptor may include one or more cables to sheath one or more sets of wiring and/or one or more suitable wireless communication devices (e.g., transmitters, receivers and/or transceivers, etc.) to facilitate wireless communications.

Any suitable number of additional input devices may be provided for the system to enhance video game scenarios. The input devices may be provided on any suitable number of control panels that are accessible by the user during system operation and have any suitable configuration (e.g., buttons, switches, keypads, etc.). The exercise mechanisms (e.g., foot pedals, stairs, ski type exercisers, treadmills, etc.) may provide any isokinetic and/or isotonic exercise features in addition to or instead of the isometric exercise features provided by effector bars. The exercise mechanisms may be assigned to any desired game functions in the manner described above and may further be resistance controlled by the exercise processor, where control signals may be transmitted to a resistance or braking device or the amount of effort required by the user may be modified.

The resistance level for the effector bar and exercise mechanisms may be controlled by adjusting amplifier or other parameters. Alternatively, the resistance level may be controlled based on thresholds entered by a user. For example, the processors (e.g., exercise and/or signal processors) may be configured to require a threshold resistance level be achieved, which is proportionate to the amount of straining force applied by the user to one or more effectors or to an amount of motion or force applied to an exercise mechanism (e.g., rate of stair climbing or pedaling, etc.) before assigning appropriate data values to the data packets to be sent to the game processor or host computer. Threshold values for the change in resistance may be input to the processor by the user via an appropriate input device (e.g., a keypad).

It is to be understood that the software of the exercise devices and/or processors (e.g., control, exercise, game, signal, switching devices, etc.) may be implemented in any desired computer language, and could be developed by one of ordinary skill in the computer and/or programming arts based on the functional description contained herein. Further, any references herein of software performing various functions generally refer to computer systems or processors performing those functions under software control. The processors (e.g., control, exercise, signal, switching device, etc.) may alternatively be implemented by hardware or other processing circuitry, or may be implemented on the game processor or host system as software and/or hardware modules receiving the sensor and/or input device information or signals. The various functions of the processors (e.g., control, exercise, signal, game, switching devices, etc.) may be distributed in any manner among any quantity (e.g., one or more) of hardware and/or software modules or units, processors, computer or processing systems or circuitry, where the processors, computer or processing systems or circuitry may be disposed locally or remotely of each other and communicate via any suitable communications medium (e.g., LAN, WAN, Intranet, Internet, hardwire, modem connection, wireless, etc.). The software and/or algorithms described above may be modified in any manner that accomplishes the functions described herein.

The terms "upward", "downward", "top", "bottom", "side", "front", "rear", "upper", "lower", "vertical", "horizontal", "height", "width", "length", "forward, "backward", "left", "right" and the like are used herein merely to describe points of reference and do not limit the present invention to any specific orientation or configuration.

The present invention exercise devices are not limited to the gaming applications described above, but may be utilized as a peripheral for any processing system, software or application.

From the foregoing description, it will be appreciated that the invention makes available a novel isometric exercise system and method of facilitating user exercise during video game play, wherein an isometric exercise device serves as a controller for video games or other applications to enable users to exercise during game play or computer simulations.

Having described preferred embodiments of a new and improved isometric exercise system and method of facilitating user exercise during video game play, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An isometric exercise system serving as a peripheral to manipulate a virtual reality scenario of a host processing system in accordance with user exercise comprising:
    a base;
    an effector providing an isometric exercise for said user, wherein said effector is secured to said base;
    at least one sensor coupled to a selected location of said effector to measure at least one force applied by said user, wherein said applied force effects a measurable deformation of said effector that is measured by said at least one sensor;
    a stabilizing member coupled to at least one of said effector and said base, wherein said stabilizing member is configured to engage user body portions and stabilizes said effector for application of said at least one force by said user, wherein said stabilizing member includes a plurality of support platforms each coupled to an opposing side of said base to support said user, wherein a weight of said user stabilizes said effector, and wherein at least one support platform includes a frame including an open interior portion, a plate disposed within said frame open interior portion, and a plurality of projections extending from said frame to couple said at least one platform to said base; and
    a controller to facilitate manipulation of said virtual reality scenario, wherein said controller is secured to said effector and includes:
        a processor to receive and process data corresponding to applied force information measured by said at least one sensor and to transfer information to said host processing system to control said virtual reality scenario in accordance with manipulation of said effector by said user.

2. The system of claim 1, wherein said controller further includes at least one input device to manipulate said virtual reality scenario, and wherein said processor transfers information to said host processing system to control said virtual reality scenario in accordance with manipulation of said at least one input device by said user.

3. The system of claim 1, wherein said host processing system includes a gaming system.

4. The system of claim 2, wherein said virtual reality scenario includes a plurality of functions enabling manipulation of that scenario, and said controller further includes an assignment module to selectively assign said effector and at least one input device to said manipulation functions to respectively control those functions in accordance with manipulation of said assigned effector and input device.

5. The system of claim 1, wherein said base includes:
    a plurality of channels defined through said base;
    a plurality of openings each defined in a top surface of said base coincident a corresponding channel; and
    a plurality of recesses each defined in said base coincident a corresponding channel and opening;
    wherein said projections each include an opening defined therein, and a projection from each support platform is inserted into a corresponding channel with associated projection openings, the base opening and base recess aligned to form a passage to receive a connector to secure said support platforms to said base.

6. The system of claim 1, wherein said support platforms are removably coupled to said base.

7. The system of claim 1, wherein said controller includes a handle to receive said at least one force applied by said user.

8. The system of claim 1, wherein said controller further includes:
    a display to display information relating to effector manipulation by said user during system operation.

9. The system of claim 8, wherein said processor further determines, based on said measured applied force, information relating to at least one of an amount of work applied by said user, an amount of weight lifted by said user and an amount of calories burned by said user and controls said display to display said determined information.

10. The system of claim 1, wherein said processor further selectively adjusts an amount of said at least one force that must be applied by said user to facilitate user interaction with said virtual reality scenario.

11. The system of claim 10, wherein said controller further includes:
a resistance input device to enter the amount of said at least one force that must be applied by said user.

12. The system of claim 1 further including:
at least one exercise mechanism manipulable by said user to effect at least one of isokinetic and isotonic exercise by said user during system operation.

13. An isometric exercise system serving as a peripheral to manipulate a virtual reality scenario of a host processing system in accordance with user exercise comprising:
a base;
an effector providing an isometric exercise for said user, wherein said effector is secured to said base;
at least one sensor coupled to a selected location of said effector to measure at least one force applied by said user, wherein said applied force effects a measurable deformation of said effector that is measured by said at least one sensor;
a stabilizing member coupled to at least one of said effector and said base, wherein said stabilizing member is configured to engage user body portions and stabilizes said effector for application of said at least one force by said user, wherein said stabilizing member includes:
a plurality of support members to engage user legs, wherein said support members are angularly displaced from each other and arranged to form an open central portion to receive said effector; and
a controller to facilitate manipulation of said virtual reality scenario, wherein said controller is secured to said effector and includes:
a processor to receive and process data corresponding to applied force information measured by said at least one sensor and to transfer information to said host processing system to control said virtual reality scenario in accordance with manipulation of said effector by said user.

14. The system of claim 13, wherein said base includes a plurality of leg members angularly displaced from each other and a receptacle disposed at a junction of said leg members to receive said effector.

15. The system of claim 14, wherein said leg members are arranged in one of a 'Y' type configuration and a cross type configuration.

16. The system of claim 13, wherein said controller further includes at least one input device to manipulate said virtual reality scenario, and wherein said processor transfers information to said host processing system to control said virtual reality scenario in accordance with manipulation of said at least one input device by said user.

17. The system of claim 13, wherein said host processing system includes a gaming system.

18. The system of claim 16, wherein said virtual reality scenario includes a plurality of functions enabling manipulation of that scenario, and said controller further includes an assignment module to selectively assign said effector and at least one input device to said manipulation functions to respectively control those functions in accordance with manipulation of said assigned effector and input device.

19. The system of claim 13, wherein said controller includes a handle to receive said at least one force applied by said user.

20. The system of claim 13, wherein said controller further includes:
a display to display information relating to effector manipulation by said user during system operation.

21. The system of claim 20, wherein said processor further determines, based on said measured applied force, information relating to at least one of an amount of work applied by said user, an amount of weight lifted by said user and an amount of calories burned by said user and controls said display to display said determined information.

22. The system of claim 13, wherein said processor further selectively adjusts an amount of said at least one force that must be applied by said user to facilitate user interaction with said virtual reality scenario.

23. The system of claim 22, wherein said controller further includes:
a resistance input device to enter the amount of said at least one force that must be applied by said user.

24. The system of claim 13 further including:
at least one exercise mechanism manipulable by said user to effect at least one of isokinetic and isotonic exercise by said user during system operation.

25. An isometric exercise system serving as a peripheral to manipulate a virtual reality scenario of a host processing system in accordance with user exercise comprising:
a base;
an effector providing an isometric exercise for said user, wherein said effector is secured to said base, wherein said base includes:
a frame including an open interior portion;
a plate disposed within said frame open interior portion; and
a receptacle disposed on said frame to receive said effector, wherein said frame and said plate engage user body portions and stabilize said effector for application of at least force by said user;
at least one sensor coupled to a selected location of said effector to measure said at least one force applied by said user, wherein said applied force effects a measurable deformation of said effector that is measured by said at least one sensor; and
a controller to facilitate manipulation of said virtual reality scenario, wherein said controller is secured to said effector and includes:
a processor to receive and process data corresponding to applied force information measured by said at least one sensor and to transfer information to said host processing system to control said virtual reality scenario in accordance with manipulation of said effector by said user.

26. The system of claim 25, wherein said controller further includes at least one input device to manipulate said virtual reality scenario, and wherein said processor transfers information to said host processing system to control said virtual reality scenario in accordance with manipulation of said at least one input device by said user.

27. The system of claim 25, wherein said host processing system includes a gaming system.

28. The system of claim 26, wherein said virtual reality scenario includes a plurality of functions enabling manipulation of that scenario, and said controller further includes an assignment module to selectively assign said effector and at least one input device to said manipulation functions to respectively control those functions in accordance with manipulation of said assigned effector and input device.

29. The system of claim 25, wherein said controller includes a handle to receive said at least one force applied by said user.

30. The system of claim 25, wherein said controller further includes:
a display to display information relating to effector manipulation by said user during system operation.

31. The system of claim 30, wherein said processor further determines, based on said measured applied force, information relating to at least one of an amount of work applied by said user, an amount of weight lifted by said user and an amount of calories burned by said user and controls said display to display said determined information.

32. The system of claim 25, wherein said processor further selectively adjusts an amount of said at least one force that must be applied by said user to facilitate user interaction with said virtual reality scenario.

33. The system of claim 32, wherein said controller further includes:
a resistance input device to enter the amount of said at least one force that must be applied by said user.

34. The system of claim 25 further including:
at least one exercise mechanism manipulable by said user to effect at least one of isokinetic and isotonic exercise by said user during system operation.

* * * * *